(12) United States Patent
Kazmi et al.

(10) Patent No.: US 8,406,790 B2
(45) Date of Patent: Mar. 26, 2013

(54) REDUCING COMPLEXITY OF PATTERN-BASED MEASUREMENTS

(75) Inventors: Muhammed Kazmi, Bromma (SE); Iana Siomina, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/380,963

(22) PCT Filed: Nov. 22, 2011

(86) PCT No.: PCT/SE2011/051402
§ 371 (c)(1),
(2), (4) Date: Dec. 27, 2011

(87) PCT Pub. No.: WO2012/141636
PCT Pub. Date: Oct. 18, 2012

(65) Prior Publication Data
US 2012/0264449 A1 Oct. 18, 2012

Related U.S. Application Data

(60) Provisional application No. 61/475,046, filed on Apr. 13, 2011.

(51) Int. Cl.
*H04W 24/00* (2009.01)
(52) U.S. Cl. .................. 455/456.1; 455/456.2
(58) Field of Classification Search .............. 455/456.2, 455/456.1, 423, 447, 40.5, 456.6, 452.1, 455/507; 370/174, 252, 208
See application file for complete search history.

(56) References Cited

U.S. PATENT DOCUMENTS

| | | | |
|---|---|---|---|
| 7,711,376 B2 * | 5/2010 | Ogino et al. | 455/456.2 |
| 2008/0152028 A1 * | 6/2008 | Futaki et al. | 375/260 |
| 2009/0002069 A1 * | 1/2009 | Furuta et al. | 330/174 |
| 2012/0040685 A1 * | 2/2012 | Escolar-Piedras et al. | 455/456.1 |
| 2012/0046030 A1 | 2/2012 | Siomina et al. | |
| 2012/0208552 A1 | 8/2012 | Siomina et al. | |
| 2012/0208566 A1 | 8/2012 | Siomina et al. | |
| 2012/0270572 A1 | 10/2012 | Siomina et al. | |

FOREIGN PATENT DOCUMENTS

| | | |
|---|---|---|
| WO | 2011/020008 A2 | 2/2011 |
| WO | 2012/021097 A2 | 2/2012 |

OTHER PUBLICATIONS

3GPP TS 36.211 V10.1.0; 3rd Generation Partnership Project; Technical Specification Group Radio Access Network; Evolved Universal Terrestrial Radio Access (E-UTRA); Physical Channels and Modulation (Release 10), Mar. 2011 (103 pages).
R4-111655; "Way Forward on Inter-frequency Test Cases", Qualcomm Inc., Feb. 2011 (3 pages).

(Continued)

*Primary Examiner* — Kiet Doan
(74) *Attorney, Agent, or Firm* — Nixon & Vanderhye P.C.

(57) ABSTRACT

A measuring node (700) in a wireless network (100) sets switching points for a plurality of measurement groups, performs measurements of signals transmitted from one or more cells corresponding to a group, and switches, at each switching point, from performing measurements according to one measurement group to performing measurements according to the next measurement group. The signals are transmitted by the cells in measurement occasions that repeat in a pattern. A switching point is a time by which the measuring node (700) node is expected to complete, at least in part, measurements of the one group and be ready to proceed with measurements of the next group. A configuring node (600) sends assistance data to the measuring node (700) to enable the measuring node (700) to determine the switching points for the measurement groups.

44 Claims, 9 Drawing Sheets

OTHER PUBLICATIONS

3GPP TS 36.133 V10.2.0; 3rd Generation Partnership Project; Technical Specification Group Radio Access Network; Evolved Universal Terrestrial Radio Access (E-UTRA); Requirements for support of radio resource management (Release 10), Apr. 2011 (418 pages).

3GPP TS 36.355 V10.1.0; 3rd Generation Partnership Project; Technical Specification Group Radio Access Network; Evolved Universal Terrestrial Radio Access (E-UTRA); LTE Positioning Protocol (LPP) (Release 10), Mar. 2011 (114 pages).

8.1.2.5.2 E-UTRAN TDD Intra-Frequency OTDOA Measurements (2 pages).

International Search Report and Written Opinion mailed Feb. 21, 2012 in corresponding International application No. PCT/SE2011/051402 (14 pages).

R4-110909; 3GPP TSG-RAN WG4 Meeting #58, Add missing inter-frequency RSTD measurement type to 36.133, Taipei, Taiwan, Feb. 21-25, 2011 (4 pages).

R4-110177; 3GPP TSG RAN WG4 (Radio) #57 AH, "Remaining issues when UE performs inter-frequency RSTD measurement", Austin, US, Jan. 17-21, 2011 (4 pages).

R4-112166, 3GPP TSG-RAN WG4 Meeting #58AH, "On restricting PRS subframe offset in inter-frequency RSTD core requirements", Shanghai, China, Apr. 11-15, 2011 (4 pages).

ETSI TS 136 355 V10.1.0, LTE; Evolved Universal Terrestrial Radio Access (E-UTRA); LTE Positioning Protocol (LPP) (corresponds to 3GPP TS 36.355 version 10.1.0 Release 10), Apr. 2011 (116 pages).

* cited by examiner

REDUCING COMPLEXITY OF PATTERN-BASED MEASUREMENTS

This application is the U.S. national phase of International Application No. PCT/SE2011/051402, filed 22 Nov. 2011, which designated the U.S. and claims the benefit of U.S. Provisional No. 61/475,046, filed 13 Apr. 2011, the entire contents of each of which are hereby incorporated by reference.

TECHNICAL FIELD

The technical field of the present disclosure generally relates to wireless communications networks where measurements are performed according to certain patterns with a certain configured activity rate or following a certain configured transmission pattern of the measured signals. The addressed problem may arise with inter-frequency positioning measurements performed on signals transmitted with certain periodicity or in heterogeneous networks with restricted measurements based on measurement patterns.

BACKGROUND

Radio measurements may be performed periodically or may be event-triggered and may or may not be performed in groups (a set of different measurements or the same measurement type for multiple cells and/or frequencies). The periodic measurements with certain intervals may be used for various purposes such as:

Enable monitoring of radio conditions and/or device movement;

Save energy by configuring longer intervals between any measurements (e.g., by configuring DRX and DTX of UE);

Measure on signals that are transmitted periodically;

Follow a measurement pattern that may periodically repeat (e.g., the measurement pattern may be measurement gaps for inter-frequency or inter-RAT measurements or it may be a measurement pattern configured by a serving radio network node for interference coordination purpose), and Follow a pattern of interference conditions that may periodically repeat.

Example

Positioning Measurements

The three main network elements in an LTE positioning architecture are the LCS Client, the LCS target and the LCS Server. The LCS Server is a physical or logical entity managing positioning for a LCS target device by collecting measurements and other location information, assisting the terminal in measurements when necessary, and estimating the LCS target location. A LOS Client is a software and/or hardware entity that interacts with a LCS Server for the purpose of obtaining location information for one or more LCS targets, i.e., the entities being positioned. LCS Clients may reside in a network node, including a radio node, or UE, and LCS Clients may reside in the LCS targets themselves. An LCS Client sends a request to LCS Server to obtain location information, and LCS Server processes and serves the received requests and sends the positioning result and optionally a velocity estimate to the LCS Client. A positioning request can be originated from the terminal or the network.

Position calculation can be conducted, for example, by a positioning server (e.g., E-SMLC or SLP in LTE) or UE. The former approach corresponds to the UE-assisted positioning mode if UE measurements are used or network-based positioning if network measurements are used, whilst the latter corresponds to the UE-based positioning mode.

Two positioning protocols operating via the radio network exist in LTE-LPP and LPPa. The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between eNodeB and LCS Server specified only for control-plane positioning procedures, although it still can assist user-plane positioning by querying eNodeBs for information and eNodeB measurements. SUPL protocol is used as a transport for LPP in the user plane. LPP has also a possibility to convey LPP extension messages inside LPP messages. Currently OMA LPP extensions are being specified (LPPe) to allow for operator- or manufacturer-specific assistance data or assistance data that cannot be provided with LPP or to support other position reporting formats or new positioning methods. LPPe may also be embedded into messages of other positioning protocol, which is not necessarily LPP.

A high-level architecture, as it is currently standardized in LTE, is illustrated in FIG. 1, where the LCS target is a terminal, and the LCS Server is an E-SMLC or an SLP. In the figure, the control plane positioning protocols with E-SMLC as the terminating point are marked as LPP, LPPa and LCS-AP, and the user plane positioning protocol are marked as SUPL/LPP and SUPL. SLP may comprise two components, SPC and SLC, which may also reside in different nodes. In an example implementation, SPC has a proprietary interface with E-SMLC, and LIp interface with SLC, and the SLC part of SLP communicates with P-GW (PDN-Gateway) and External LCS Client.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques.

The LCS Target may decide or may be requested to perform measurements to enable its positioning, which measurements may be reported to another node (e.g., with UE-assisted positioning) or used by the measuring device (e.g., with UE-based positioning).

Positioning measurements (e.g., for OTDOA positioning method) may be performed on periodically transmitted positioning reference signals (PRS). PRS are transmitted in pre-defined positioning subframes grouped by several consecutive downlink subframes ($N_{PRS}$), i.e., one positioning occasion. Positioning occasions occur periodically with a certain periodicity of N subframes, i.e., the time interval between two positioning occasions (see FIG. 2). The standardized periods N are 160, 320, 640, and 1280 ms, and the number $N_{PRS}$ of consecutive downlink subframes are 1, 2, 4, and 6.

PRS may be configured also in cells operating in different frequencies, which enables e.g., inter-frequency/inter-band RSTD positioning measurements, but also inter-RAT positioning measurements (e.g., considering that LTE FDD and LTE TDD may also be considered as different RATs). With inter-frequency positioning measurements, PRS occasions are likely to be configured in the network such that they do not overlap to satisfy the inter-frequency RSTD requirement that measurement gaps shall not overlap with PRS subframes on the serving carrier frequency. This is because although some UEs may not need measurement gaps for the inter-frequency positioning measurements, there may still be at least some UEs in the network that do require measurement gaps.

To make positioning measurements more efficient, the UE may implement grouping. For example, cells from different cell groups, where a group may be characterized by a certain carrier frequency, are measured for the purpose of positioning during non-overlapping time intervals, e.g., the groups are orthogonal in time.

The UE may receive assistance data from the network. For example, with OTDOA assistance data, the UE receives any one or more of cell identifications, cell frequencies, measured signal configurations (e.g., PRS configuration), measurement bandwidth (e.g., PRS measurement bandwidth), number of consecutive subframes configured for performing measurements (e.g., $N_{PRS}$), measurement periodicity (e.g., $T_{PRS}$), expected reference signal time difference (RSTD), expected RSTD uncertainty, etc.

Example

Restricted Measurements in Heterogeneous Networks

In 3GPP, heterogeneous network deployments have been defined as deployments where low-power nodes of different transmit powers are placed throughout a macro-cell layout, implying also a non-uniform traffic distribution. Such deployments are, for example, effective for capacity extension in certain areas, so-called traffic hotspots, i.e., small geographical areas with a higher user density and/or higher traffic intensity where installation of pico nodes can be considered to enhance performance.

However, heterogeneous deployments also bring challenges. For example, due to a possible large difference in transmit power levels between neighboring cells, there may be situations when an interfering cell is stronger, as seen by the UE, than the desired signal. Such situation may occur, e.g., in an area with deployed home/femto base stations associated with CSG cells and macro base stations. One way to coordinate interference in such networks is to coordinate transmissions from the strongly interfering neighbor cells and let the UEs which are suffering from strong interference to measure when these transmissions do not occur. Such a technique is possible with configuring almost blank subframes and informing the UEs about subframes preferred for UE measurements by means of signaling (e.g., via RRC) restricted measurement patterns (e.g., for RRM, RLM and/or CSI measurements). Such patterns are characterized by pattern length (40 ms for FDD and 20/60/70 ms for different UL/DL TDD configurations), periodicity (the same as the pattern length, and a pattern of the given length with indicators indicating the subframes recommended for UE measurements.

The patterns may be further characterized e.g., by a muting or a blanking rate. The UE requirements (e.g., RRM, RLM and CSI) are likely to be specified for patterns characterized by a certain minimum blanking rate (e.g., all patterns with blanking rate not less than ⅛ or ⅒) rather than for a specific pattern. Requirements specified in this way may also imply that the UE does not have to report more frequently than e.g., every eighth or tenth subframe. Restricted measurement patterns for heterogeneous deployments are defined by the current standard in the time domain, but they may also be in the time and/or frequency domains.

UE Activity States

An important aspect of packet transmission is discontinuous transmission (DTX) and discontinuous reception (DRX). The E-UTRAN is primarily a packet oriented system without any circuit switch transmission. This means E-UTRAN can easily be optimized for packet transmission.

In E-UTRAN, the DRX is used in both idle and RRC connected modes. The UE measurements may be performed in idle and/or RRC connected states. For example, positioning measurements are typically performed in the connected mode, whilst measurements for MDT may be performed in either of the two modes. Furthermore in E-UTRAN, a wide range of DRX cycles for use in the RRC connected mode is allowed by the network; the DRX can vary between 2 ms to 2.56 seconds.

The discontinuous transmission (DTX) such as discontinuous power control and use of idle gaps for measurements may be configured e.g., for the energy saving purpose, but on the other hand measurement performance is typically affected, e.g., there may be a degradation in accuracy and/or the measurement period may need to be increased. The DTX is characterized by periodic pattern of activity or transmission followed by relatively longer inactivity or idle periods. In UTRAN, the DTX is characterized by discontinuous power control channel (DPCCH) and is used to reduce the interference and UE power. Similarly other idle gaps such as compressed mode gaps and measurement gaps are used in UTRAN and E-UTRAN, respectively. In E-UTRAN, the DTX state also occurs due to packet oriented transmission and semi-persistence scheduling.

Duplex Modes

LTE specification enables Frequency Division Duplex (FDD) and Time Division Duplex (TDD) operation modes. Compared to TDD, the measurement occasions (MO) in FDD may be further restricted to only DL or only UL subframes. UL/DL configuration for TDD is specified in 3GPP by defining a certain pattern for UL/DL subframes available within a radio frame. See 3GPP TS 36.211, Evolved Universal Terrestrial Radio Access (E-UTRA); Physical Channels and Modulation.

Additionally, half duplex operation is also specified, which is essentially FDD operation mode but with transmission and receptions not occurring simultaneously as in TDD. Half duplex mode has advantages with some frequency arrangements where the duplex filter may be unreasonable, resulting in high cost and high power consumption. Since carrier frequency number (EARFCN) is unique, by knowing it, it is possible to determine the frequency band, which is either FDD or TDD. However, it may be more difficult to find difference between full duplex FDD and half-duplex FDD (HD-FDD) without explicit information since same FDD band can be used as full FDD or HD-FDD.

Requirements and Impact

Minimum measurement and performance requirements are necessary to ensure good service quality and consistent implementation of wireless devices and networks nodes. The requirements ensure certain minimum device and radio node capability, ability to deal with a minimum set of configurations, and thus impose certain implementation constraints, which may limit design flexibility but on the other hand ensure reasonable device and node complexity.

Typically, specified requirements account for the impact of using various measurement patterns, e.g., due to duplex mode, activity states, restricted measurement patterns or signal periodical availability. For some measurements, the requirements may be generic with respect to some patterns. For example, for some measurements the requirements may be the same for FDD and TDD, but such generic requirements are typically determined by the most relaxed requirements to cover both cases. As another example, the RSTD positioning requirements are the same regardless whether DRX cycle is used or not and also the same for all possible DRX cycles.

More often, however, the requirements are dependent on the activity periods, e.g., requirements for UE Rx-Tx measurements used for E-CID positioning method are dependent on DRX cycle. Signal availability may also impact the measurement requirements, e.g., measurement period. For example in case of OTDOA, which relies on PRS, the minimum RSTD measurement reporting delay requirements are specified as a function of the longest PRS signal periodicity among all cells for which RSTD measurements are requested by the network. Another example is that measurement requirements with eICIC (e.g., RRM measurements such as RSRP and RSRQ, RLM measurements and CSI measurements) are defined for a certain minimum blanking rate of measurement patterns. More specifically, the current specification [TS 36.133] specifies that the RRM and RLM requirements with the time domain measurement resource restrictions apply when the time domain measurement resource restriction pattern configured for the measured cell indicates at least one subframe per radio frame for performing the corresponding measurement.

UE Complexity and Types of Measurements

Minimizing UE complexity is one of the most important design goals, even for the most advanced UEs. The UE complexity may be characterized e.g., by the available memory size and buffering capacity, processing power, algorithm complexity, etc. The UE complexity may be determined based on several factors. Such factors include:

Set of supported measurements and measurement types (e.g., intra-frequency, inter-frequency, inter-band, inter-RAT);

Types and the number of measurements that may be performed in parallel (e.g., may be related to the measurement reporting criteria and the related capability);

Number of supported frequency bands, RATs;

Maximum number of simultaneously measured cells, frequencies, etc.;

Possibility to perform serial measurements or group-serial measurements with smaller cell groups (e.g., within one frequency or over multiple frequencies); and Minimum available processing time for each measurement or measurement group (which may be particularly important for resource-demanding measurements or low-complexity devices).

Most of the factors above are determined by UE requirements, which directly or indirectly ensure that the UE is capable of certain set of functionalities and achieves a certain level of performance in predefined conditions.

When a certain predetermined minimum measurement periodicity can be assumed (e.g., according to measurement requirements), device implementation may be built on this assumption and reserve this time for other processes. However, combining two (or more) such measurement patterns such that the sampling for the two groups of measurements are not performed at the same time, implies a need for even faster processing and a requirement for shorter cross-layer delays, e.g., when there is a limitation on the amount of buffer memory which there has to be efficiently reused.

Positioning measurements may be very memory and processing demanding such as when multiple cells need to be measured (up to 24 cells per carrier frequency, up to 3 carrier frequencies may be measured in LTE). Furthermore, when the measurements are to be performed on multiple frequencies, bands or RATs (radio access technologies), the amount of data that needs to be processed may become many-fold compared to intra-frequency measurements.

One example is inter-frequency RSTD measurements based on PRS with the smallest periodicity $T_{PRS}$=160 ms and the requirement that PRS positioning occasions on different frequencies shall not overlap (see FIG. 3), which together imply that some UE designs, e.g., those performing measurements in all PRS positioning occasions, may have the minimum remaining processing time to be at most $T_{PRS}/2$ when two frequencies are considered ($T_{PRS}/2$ corresponds to the case when PRS occasions on f2 are exactly in between PRS positioning occasions on f1).

In FIG. 3, shifted PRS positioning occasions allow for less processing time if the buffer needs to be empty before the next group measurement sampling, i.e., the implementation cannot rely on that the minimum time between MOs is $T_{PRS}$ since $\Delta_1, \Delta_2 \leq T_{PRS}$, where $T_{PRS}$ is the minimum PRS measurement periodicity among the measured cells provided in the OTDOA assistance data, $\Delta 1$ is the time from the beginning of the positioning MO on frequency f2 to the beginning of the positioning MO on frequency f1, and $\Delta 2$ is the time from the beginning of the positioning MO on frequency f1 to the beginning of the positioning MO on frequency f2.

One existing proposal has been that the set of allowed offset values between the closest PRS positioning occasions on the 2 frequencies shall be restricted to be at least 160 ms ($T_{PRS}$=160 ms is the minimum PRS periodicity) or the PRS occasions across frequencies shall overlap, which are the requirements on PRS configuration provided by the network. The disadvantages with this approach are that it applies for all $T_{PRS}$ (which is not needed as will be shown later) and that positioning requirements with $T_{PRS}$=160 ms become obsolete since there is a requirement that measurement gaps on f2 cannot overlap with PRS on f1 which typically implies that PRS on f2 cannot overlap with PRS on f1. This proposal therefore does not solve the identified problem.

Another example may be when a UE receives two patterns for restricted measurements in relation to eICIC for two groups of measurements (e.g., two groups of cells, where the groups of cells may be on the same or different frequencies).

Another example is when UE performs intra-frequency measurements on serving carrier and inter-frequency/inter-RAT measurements in periodic gaps, e.g., measurement gaps in E-UTRAN. In this case the UE has less time to measure and process reference/synchronization signals on the intra-frequency. Therefore intra-frequency requirements are relaxed when gaps are configured on the serving carrier i.e., longer intra-frequency measurement period applies in this case.

Yet another example is when UE performs several inter-frequency/IRAT measurements in idle or in connected mode. In these examples, the inter-frequency/IRAT measurement requirements (e.g., cell search delay, measurement period, etc.) increase with the increase in the number of frequency layers configured for measurements. Each frequency layer refers to an inter-frequency or inter-RAT carrier frequency. Especially under eICIC TDM patterns there will be more constraints on the UE for performing different types of measurements.

Yet another example is when periodic UE activity patterns are used, e.g., if UE activity patterns are configured per group of measurements (e.g., per frequency or RAT), then a UE activity pattern may be viewed as a measurement group pattern and then the problems described above also apply.

SUMMARY

A non-limiting aspect of the disclosed subject matter is directed to a method performed at a measuring node, e.g., a UE, to perform measurements of signals in a wireless network. The method comprises setting switching points for a plurality of measurement groups. Each measurement group specifies measurements to be made by the measuring node of one or more signals transmitted by one or more cells. The one or more signals of each measurement group are transmitted by one or more cells in measurement occasions corresponding to that measurement group in which the measurement occasions corresponding each measurement group repeats in a pattern associated with that measurement group. A switching point is a time by which the measuring node is expected to complete, at least in part, the measurements of one measurement group and to be ready to proceed with measurements of another measurement group. The method also comprises performing measurements of the signals corresponding to a measurement group. The method further comprises switching, at each switching point $sp_{x \to y}$, from performing measurements according to a measurement group x to performing measurements according to a measurement group y.

Another non-limiting aspect of the disclosed subject matter is directed to a method performed at a configuring node, e.g., a network node, to configure measurements in a wireless network. The method comprises determining a plurality of measurement groups based on a list of one or more signals to be measured by a measuring node. The plurality of measurement groups enables the measuring node to determine switching points for the measurement groups. The one or more signals of each measurement group are transmitted by the one or more cells in measurement occasions corresponding to that measurement group.

Another non-limiting aspect of the disclosed subject matter is directed to a measuring node, e.g., a UE, structured to perform measurements of signals in a wireless network. The measuring node comprises a communication device structured to communicate with other network nodes, and a switch point setting device structured to set switching points for a plurality of measurement groups. The measuring node also comprises a measurement group device structured to perform measurements of the signals corresponding to a measurement group. The measuring node is also structured to switch at each switching point $sp_{x \to y}$ from performing measurements according to a measurement group x to performing measurements according to a measurement group y.

Another non-limiting aspect of the disclosed subject matter is directed to a configuring node structured to configure measurements in a wireless network. The configuring node comprises a measurement group device structured to determine a plurality of measurement groups based on a list of one or more signals to be measured by a measuring node and based on an inter-group measurement handling capability of the measuring node.

Another non-limiting aspect of the disclosed subject matter is directed to a non-transitory computer readable medium storing therein programming instructions executable by a computing device of a node in a wireless network to perform the method of the measuring node as described above.

Another non-limiting aspect of the disclosed subject matter is directed to a non-transitory computer readable medium storing therein programming instructions executable by a computing device of a node in a wireless network to perform the method of the configuring node as described above.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
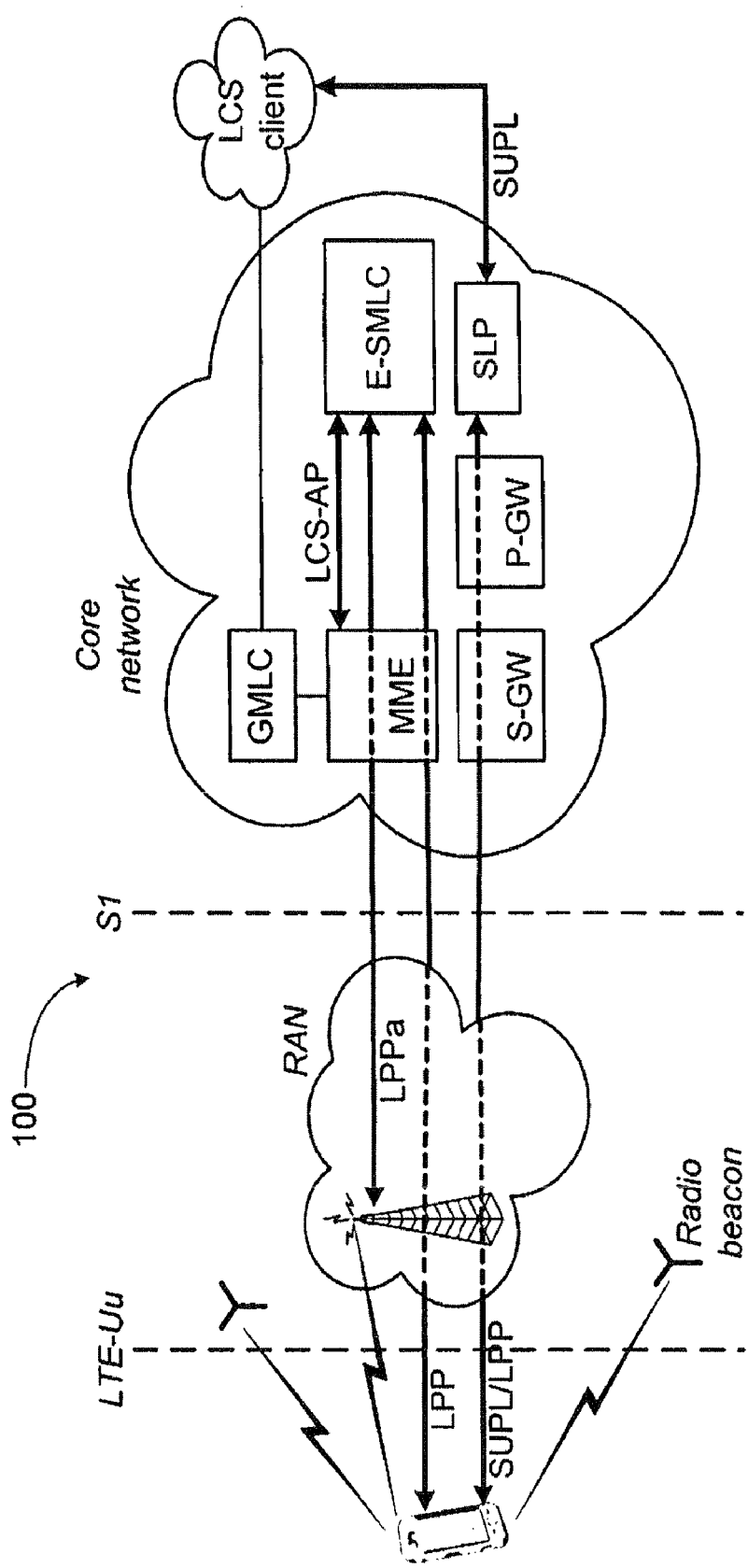
FIG. 1 illustrates an example of a positioning architecture in LTE.
Figure 2:
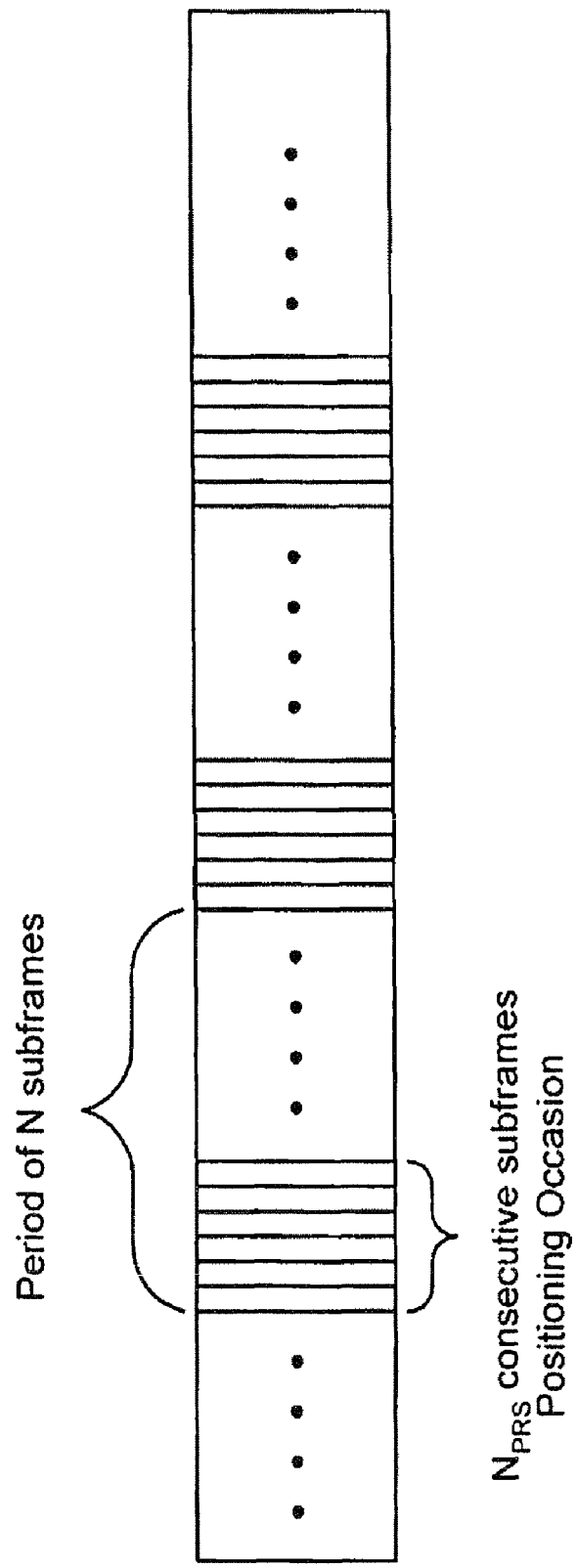
FIG. 2 illustrates an example of a positioning subframe allocation in time for a single cell.
Figure 3:
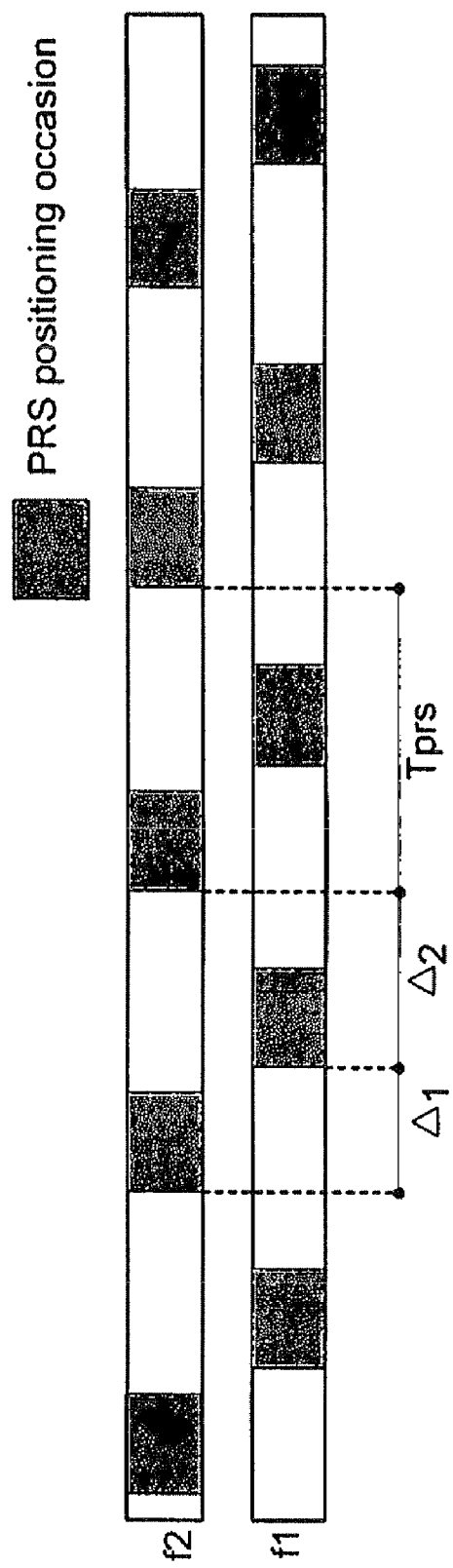
FIG. 3 illustrates shifted positioning occasions for two frequencies.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

Although terminologies from 3GPP are used in this disclosure for explanation purposes, this should not be seen as limiting the scope of the disclosed subject matter to only the aforementioned system. Other wireless systems, including WCDMA, WiMax, UMB, GSM and others may benefit from exploiting the ideas covered within this disclosure. Furthermore, the embodiments described herein may also apply in wireless networks supporting more than one radio access technology (RAT).

It is indicated in the background section that pattern-based measurements may be used for multiple desirable purposes such as to monitor radio conditions, save energy, measure periodically transmitted signals, and follow a pattern of interference conditions that may periodically repeat just to name a few. However, as also indicated, there are several problems with existing ways of conducting the pattern-based measurements. In most instances, the measurement requirements can work against the goal of minimizing complexity, of the UE for example.

Before proceeding further, it should be noted that pattern based measurements do not necessarily imply periodic measurements with a fixed and equal periodicity, but may also be understood as periodic measurement activity of a measuring device or radio node, e.g., one or a group of cells may be measured during such activity slot where the measurement activity slots may occur according to a certain pattern. In this case at least some of the reasons listed above may also apply.

The patterns may also be used in frequency domain. For instance CSI measurements may be performed in certain specific resource blocks or in certain group of resource blocks. The frequency and time domain pattern can also be combined. For example the CSI measurement may be performed periodically in time over certain group of resource blocks in frequency.

One or more non-limiting aspects of the disclosed subject matter address some or all of the issues described above with respect to the conventional solutions. In general, the inventive aspects incorporate some or all of the following:

Determining the optimal switching point and inter-group offsets that may be implemented statically (e.g., as a part of cell planning), semi-statically (e.g., for a group of cells and/or group of UEs) or dynamically (e.g., per UE), and determining restrictions;

Optimizing the number and periodicity of switching points such as minimizing the number of configured but unused, e.g., due to processing capability, measurement occasions and the switching time;

UE signaling its capability of handling inter-group measurements, e.g., the number of parallel or overlapping measurement patterns that can be measured or the maximum supported inter-group offset to the network (e.g., eNode B, E-SMLC, other network node, etc) or to another UE; and Configuring node using UE capability information in optimizing the switching point and/or signal configuration or measurement configuration or activity configuration or duplex configuration of cells, for cells, for group of UEs, for UE, etc.

The disclosed subject matter is not limited to the currently standardized measurements and services/functionalities such as positioning or enhanced Inter-Cell Interference Coordination (eICIC).

The measurement patterns herein shall be understood in a general sense. The patterns may be predefined (e.g., by a standard) or may be signaled to the measuring device or node (e.g., in the assistance data such as positioning assistance data signaled via LPP or LPPe in LTE or measurement configuration signaled via RRC in LTE). The patterns may comprise periodic MOs with same or varying periodicity between the MOs. A pattern may or may not be characterized by a pattern length (e.g., eICIC patterns typically have a predetermined length and may also repeat periodically, whilst DRX configurations or PRS signals are typically defined by a periodicity until further configuration change notice). The measurement pattern may also follow a signal transmission pattern (e.g., PRS measurement patterns have to follow periodic PRS transmission patterns, i.e., PRS measurements for a cell are generally not configured when PRS signals are not transmitted in the cell).

At least some embodiments are described for group(s) of measurements. A group shall be understood in a general sense and in the simplest case it comprises of one measurement. Some examples are a group of cells, a group of frequencies and/or RATs where each there is also at least one group of measurements (e.g., 1 measurement per cells or a set of measurements including RSRP and RSRQ) for frequency and/or RAT. At least some embodiments are described for a given number of measurement groups (e.g., two groups of cells, one group per frequency), which is not a limitation and may be further extended for a larger number of measurements groups.

The signaling described herein can be via direct links or logical links (e.g., via higher layer protocols and/or via one or more network nodes). For example, in LTE in the case of signaling between the E-SMLC and the LCS Client, the positioning result may be transferred via multiple nodes (at least via MME and/or GMLC).

Although the description is mainly given for a UE as a measuring node, it should be understood that "UE" is a non-limiting term which means any wireless device or node (e.g., PDA, laptop, mobile, sensor, fixed relay, mobile relay or even a radio base station that has a measurement capability). The described subject matter may apply for non-CA UE or both for UEs capable and incapable of performing inter-frequency measurements without gaps, e.g., also including UEs capable of carrier aggregation.

Some embodiments apply to network nodes transmitting signals according to patterns, e.g., eNodeBs in LTE, and/or network nodes configuring the assistance data or any signaling means for communicating the patterns to the UE, e.g., positioning node, eNodeB, O&M, etc. The network nodes that configure assistance data to the measuring node are also referred to as configuration nodes. Configuring nodes can configure parameters that can be used by the UE for measurements.

Positioning node described in some embodiments is a node with positioning functionality. For example, for LTE, it may be understood as a positioning platform in the user plane (e.g., SLP in LTE) or a positioning node in the control plane (e.g., E-SMLC in LTE). SLP may also comprise SLC and SPC, where SPC may also have a proprietary interface with E-SMLC. In a testing environment, at least the positioning node may be simulated or emulated by test equipment.

A cell is associated with a radio node, where a radio node or radio network node or eNodeB used interchangeably in this description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or muti-RAT node which may e.g., support multi-standard radio (MSR) or may operate in a mixed mode.

The disclosed subject matter is not limited to LTE, but may apply with any RAN, single- or multi-RAT. Some other RAT examples are LTE-Advanced, UMTS, GSM, cdma2000, WiMAX, and WiFi.

Different measurement grouping principles or criteria may apply for the uplink (UL) and the downlink (DL). The embodiments described for DL may also be adapted for UL (the corresponding terminology shall then apply, e.g., the transmitting side may be the UE or a radio node and the receiving side may be a radio node, relay, etc.).

Switching Point and Unused Measurement Occasions (UMO)

In this part of the disclosure, the concept of inter-group measurement switching point is described as well as its relation to the minimum time necessary to complete measurements. A switching point $sp_{x \rightarrow y}$ herein is a time by which a UE is expected to complete, at least in part, a group x (or a set x of groups) of measurements and be ready to proceed with another group y (or a y set of groups) of measurements. The "at least in part" is to indicate that the UE may stop sampling, but may also maintain in memory aspects of the performed measurements. Also, it should be noted that the measurements for the group y may not necessarily start immediately after the switching has been initiated since the switching itself may also take some time.

In one non-limiting example, different groups comprise cells on different carrier frequencies. Incomplete measurements from one group can make MOs of the other group of measurements infeasible and therefore unused.

A switching point associated with the first group may be described as a time interval $\Delta$ from the beginning of the last measured/used first-group measurement occasion MO to the time when the UE switches from the first group to the second group. If $\Delta<T^*$ where $T^*$ is the minimum time necessary to complete the group measurements at least in part, the first-group measurements may still be incomplete, and thus the second-group measurements may not yet be possible which may leave the second-group measurement occasion MO unused and is referred to as an unused measurement occasion (UMO).

Even when $\Delta>T^*$, it may be that the UE does not start the second-group measurements before the switching point, and thus a UMO may still occur, which is preferably avoided whenever possible. The time interval $\Delta$ and the minimum time $T^*$ necessary to complete the group measurements, at least in part, may be group-specific or UE-specific, e.g., there may be different $\Delta_1$, $\Delta_2$, etc., and $T_1^*$, $T_2^*$, etc. for measurement groups 1, 2, etc.

Measurement grouping may be based on any one or more of considerations including measurement types, measured frequency, and measured RAT. The measurement group can apply in both connected and idle modes. There may also be one or more patterns for frequency/RAT, for example, with eICIC, there can be CSI, RRM, and RLM patterns which may or may not overlap. Also, a pattern may be configured for the serving cell and another pattern for neighbor cells. It is also possible that some patterns may be later standardized for inter-frequency and/or inter-RAT. A switching point may thus also be defined for such groups.

Measurements may be performed following patterns which schedule the measurements in time and/or frequency domain, per group or across groups. For instance, CSI measurements are typically performed in certain specific resource blocks or in certain group of resource blocks. The frequency and time domain pattern can also be combined. For example the CSI measurement may be performed periodically over certain group of resource blocks.

Figure 4:
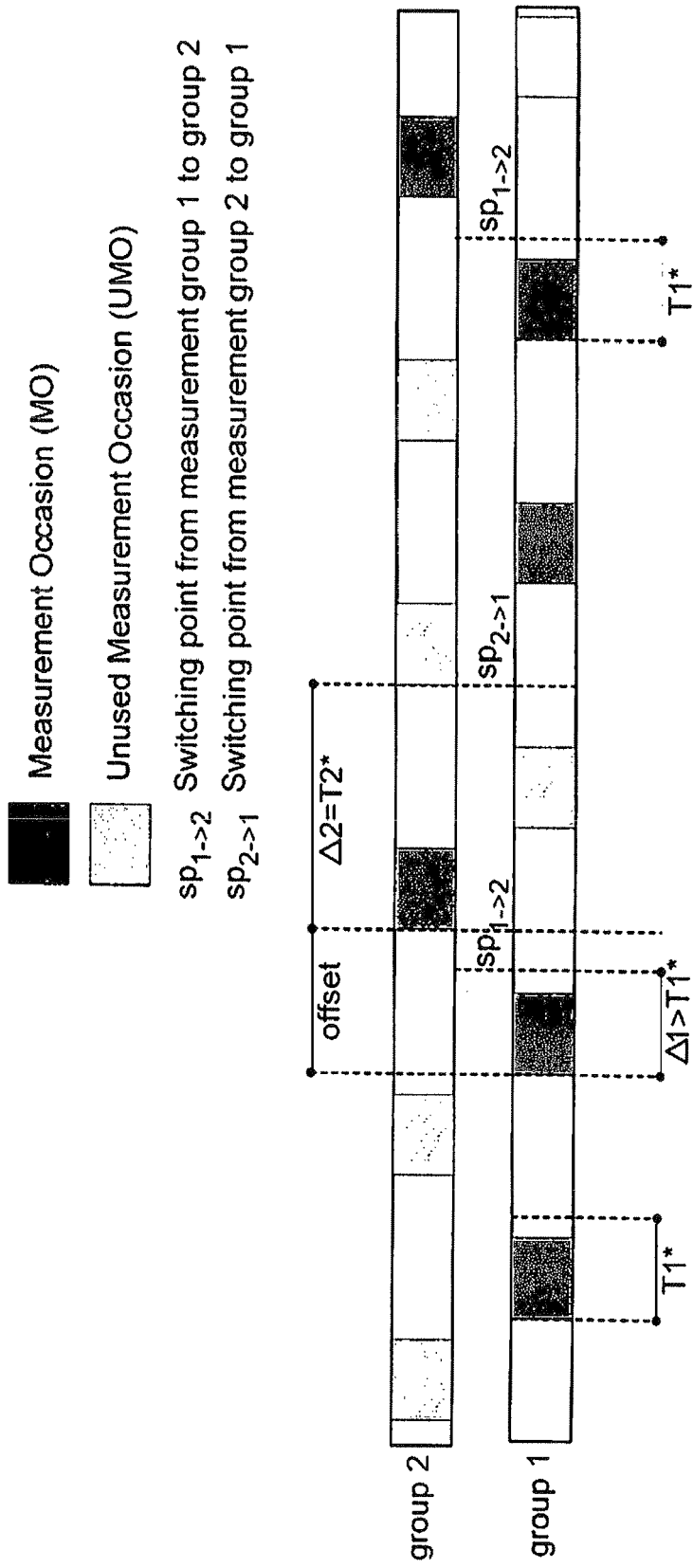
FIG. 4 illustrates an example of intergroup switching points for two measurement groups.

An example with inter-group switching points for two groups of measurements is illustrated in FIG. 4. In the figure, $\Delta_1>T_1^*$ and $\Delta_2=T_2^*$. As shown, switching points are used to switch between MOs of group 1 and group 2. One can observe that many MOs may become UMOs when the switching points $sp_{1 \rightarrow 2}$ and $sp_{2 \rightarrow 1}$ are not optimized.

One can also observe that to a large extent, the resource utilization efficiency is determined by the configured MOs which may be in turn determined by the signal transmission configuration (e.g., cell-specific PRS configuration), measurement gap configuration, configured DRX, DTX, duplex configuration, etc. These configuration parameters may be optimized, e.g., by the UE or by the network, to enable best switching point configuration. The optimized switching point configuration may also be based on at least one of:

The amount of necessary measurements in each group, which may depend on the number of cells per group, number and type of measurements, and so on. The relation among the measurement groups of the number of configured consecutive MOs per group may be proportional to the relation of the amount of necessary measurements per group;

Minimum necessary number of consecutive MOs per group (may depend on the minimum required accuracy and/or the maximum reporting delay for the group measurements or any of the measurement performed in the group measurements); and Maximum waiting time before the group measurement can start (may depend on the required reporting periodicity).

To minimize the impact of UMO, it may be preferable to perform as many measurements in consecutive MOs of each measurement group as possible, which may not always be feasible, e.g., due to the factors above.

In one aspect, the minimum number of consecutive MOs before switching to another group measurement is introduced as a requirement or a reference device design/implementation, e.g., a minimum of two PRS positioning occasions per frequency prior switching for other positioning measurements on another carrier frequency. In another aspect, this minimum number of consecutive MOs is determined by the maximum allowed number of UMOs. In one non-limiting embodiment, the switching points are decided by the measuring UE.

It may also be useful to configure offsets between MOs of different groups, e.g., when different groups comprise different cells and the SFN time alignment of the cells is not known to the UE. For example, prs-subframeOffset may be signaled in the positioning assistance data to indicate the relative offset between the PRS positioning occasions of two cells operating on different frequencies. See e.g., 3GPP TS 36.355, Evolved Universal Terrestrial Radio Access (E-UTRA); LTE Positioning Protocol. In FIG. 4, an offset between the closest MOs of the first and the second groups is illustrated. In this figure the offset is between two utilized MOs, which is, however, not a requirement. The signaled offset in this example is the offset between any two closest PRS positioning occasions as configured in the network, which however does not say whether and which MOs are UMO or not.

The switching points have a tight connection to the offsets, and may be configured at any time point between the end of the last MO configured for the first group measurements and the beginning of the MO configured for the second group measurements. Deciding the offset thus determines the time interval where the switching point may occur, and vice versa—deciding the switching point may determine the offset to the next MO of the corresponding group. Limiting the set of the offset values can limit the network flexibility and may also impose some UE implementation constraints which impact the network implementation and which are not always beneficial for the UE either.

Feasible and Optimal Intergroup Offsets

Without loss of generality, it can be assumed $\Delta_i = T^*$ and $T_i \leq T_{i+1}$ (or $\alpha_{i+1} T_i = T_{i+1}, \alpha_{i+1} \geq 1$). Assume two measurement groups i=1, 2, although the disclosed subject matter may be generalized to more than 2 groups. Two offsets can be further introduced where $\text{offset}_{1 \to 2}$ corresponds to the offset from the first group MO to the second group MO and $\text{offset}_{2 \to 1}$ corresponds to the offset from the second group MO to the first group MO, respectively. With the above assumptions, the following relations hold:

$$\text{offset}_{1 \to 2} + \text{offset}_{2 \to 1} = T_1$$

$$k_1 T_1 + \text{offset}_{1 \to 2} \geq T^*, k_1 = 0, 1, 2, \ldots$$

$$k_2 T_2 + \text{offset}_{2 \to 1} = k_2 \alpha_2 T_1 + \text{offset}_{2 \to 1} \geq T^*, k_2 = 0, 1, 2, \ldots \quad (1)$$

There may exist a requirement restricting overlap between two-group MOs (e.g., MOs in $\epsilon$ subframes should not overlap; e.g., for FDD RSTD inter-frequency measurements $\epsilon$ may be 6 subframes, whilst for TDD RSTD inter-frequency measurements $\epsilon$ may be larger to account for UL/DL configurations e.g., 6/N*10 or (6/N−1)*10+ind where N is the number of DL subframes per radio frame and ind is the index of the last DL subframe in the TDD radio frame as defined in 3GPP TS 36.211, giving $\epsilon$=25 for UL/DL configuration 0). If such a restriction on the overlap exists, then e.g., the following constraints may also be added:

$$\epsilon \leq \text{offset}_{1 \to 2}$$

$$\epsilon \leq \text{offset}_{2 \to 1} \quad (2)$$

Since $k_i$, i=1, 2, is the number of UMOs in the measurement group i due to switching, it is reasonable to minimize a function related to the number of UMOs, e.g., find $k_i$ minimizing the function $$k_1 T_1 + k_2 T_2 \to \min. \quad (3)$$

It is easy to see that for a given combination of $(k_1, k_2)$, the system has a unique feasible offset solution, given (2) is met, when $\text{offset}_{1 \to 2} = T^* - k_1 T_1$ and $\text{offset}_{2 \to 1} = T^* - k_2 \alpha_2 T_1$, which in combination with the $1^{st}$ relation of (1) gives $$T^* - k_1 T_1 + T^* - k_2 \alpha_2 T_1 = T_1, \text{ or}$$

$$2T^* = T_1(1 + k_1 + k_2 \alpha_2) \quad (4)$$

This unique feasible solution is also optimal when $k_1 = k_2 = 0$, since (3) is then minimized. For some parameter combinations, the optimal solution may be only obtained with $k_1 > 0$ and/or $k_2 > 0$, when there is no feasible solution that meets all constraints with both $k_1$ and $k_2$ equal zero.

Figure 5:
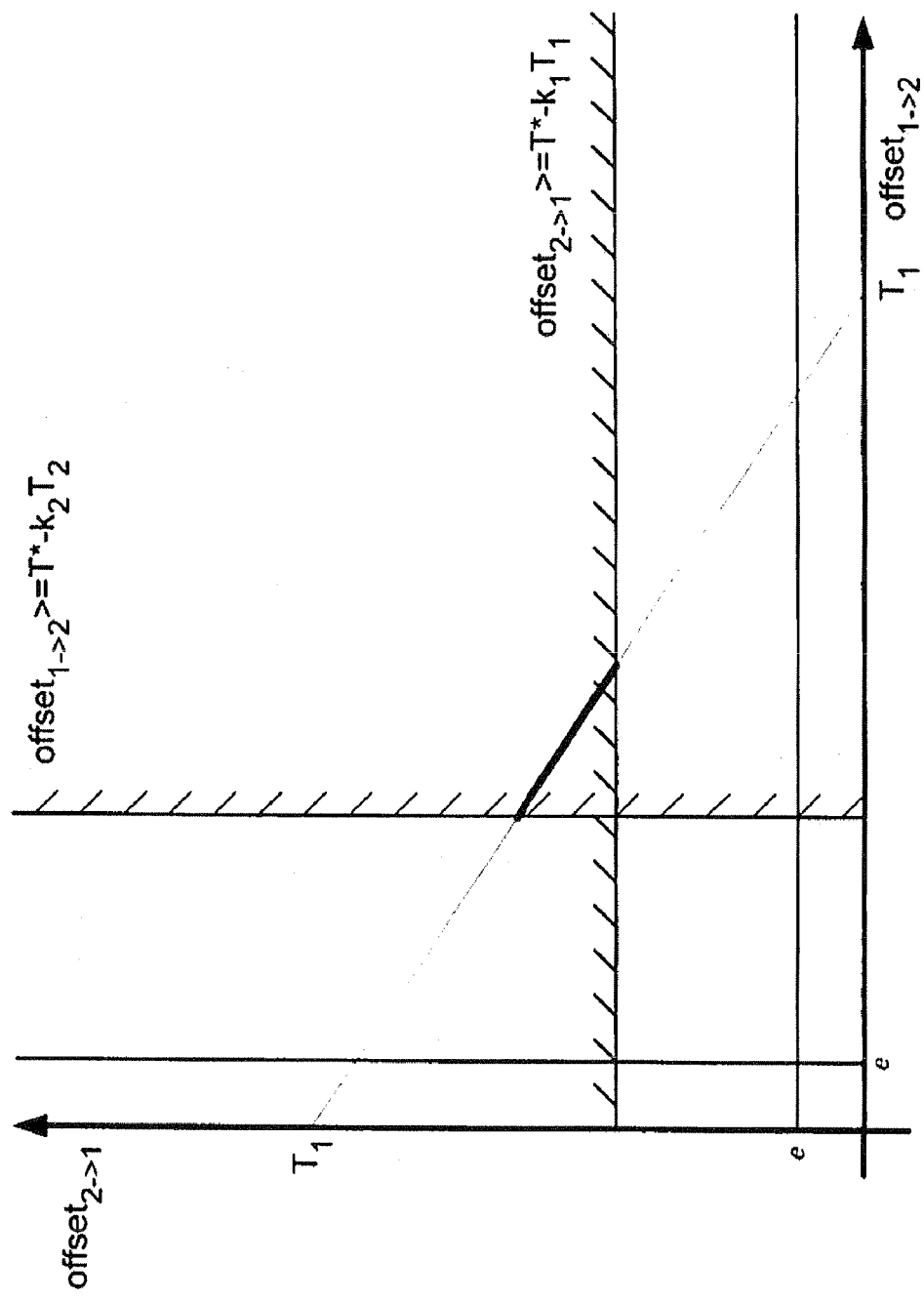
FIG. 5 illustrates an example of a feasible offset solution.

As an example, from (4), one can find that if $T^* = T_1/2$, then $k_1 = k_2 = 0$ is the best solution, e.g., there are no UMOs with $T^* = 80$ ms and $T_1 = 160$ ms or $T^* = 160$ ms and $T_1 = 320$ ms configured in the positioning example, and the optimal/unique offsets are $\text{offset}_{1 \to 2} = \text{offset}_{2 \to 1} = T^*$. It is also easy to see that:

there is no feasible offset solution without UMO (i.e., with $k_1 = k_2 = 0$) when $T^* > T_1(1 + k_1 + k_2 \alpha_2)/2$, e.g., when $T^* = 160$ ms and $T_1 = 160$ ms, and there are more than one feasible solution when $T^* < T_1(1 + k_1 + k_2 \alpha_2)/2$ (see the thickened portion of line connecting $T_1$ in the vertical axis $T_1$ in the horizontal axis in FIG. 5), e.g., $\text{offset}_{1 \to 2}$ may be 159 ms or 160 ms or 161 ms with corresponding $\text{offset}_{2 \to 1}$ of 161 ms or 160 ms or 159 ms when $T^* = 159$ ms and $T_1 = T_2 = 320$ ms.

Preferably, an indicator is sent indicating whether the inter-group offset is the same or different for different groups.

Additional Restrictions on the Set of Feasible Offset Values

There may be additional restrictions on the set of feasible offset values, which may exclude certain offset combinations. For example, there may be a requirement that measurement gaps used for the second group measurements on frequency f2 shall not overlap with the first group MOs on f1. Measurement gaps have periodicity of 40 ms or 80 ms—one measurement gap is of 6 ms.

When inter-frequency RSTD measurements are configured, the measurement requirements for all measurements performed in gaps apply provided that the measurement gaps with a periodicity of 40 ms is used. The minimum PRS periodicity is 160 ms. Furthermore, all predefined PRS periodicity values (160 ms, 320 ms, 640 ms, and 1280 ms) are multiples of the measurement gap periodicity. This means that the unique optimal offset solution in Example 1 ($\text{offset}_{1 \to 2} = \text{offset}_{2 \to 1} = T = 160$ ms for $T_1 = 320$ ms and $k_1 = k_2 = 0$, which results in measurement gaps overlapping with PRS positioning occasions) is not feasible with this measurement gap overlap restriction.

To account for this new restriction, the measurement gap pattern periodicity should be considered also; thus, the first inequality of (2) may be modified e.g., as follows $$\epsilon \leq \text{mod}(\text{offset}_{1 \to 2}, \text{measGapPeriodicity}), \quad (5)$$

assuming that the measurement gaps are configured for the second-group measurements (on f2) and are aligned with PRS positioning occasions on f2 (some misalignment may require some adjustment of the $\epsilon$ value in (5)). If the frequency f1 is not the serving frequency, then $\epsilon$ has to also account for the offset between the serving cell PRS positioning occasions and the first-group MOs or measurement gap configuration. Note, that the number of consecutive subframes per MO may also be additionally included in (5), e.g., $\epsilon \leq \text{mod}(\text{offset}_{1 \to 2}, \text{measGapPeriodicity} - N_{consSubframes})$.

In one embodiment, instead of the new constraint (5), a similar restriction on combinations of the PRS subframe offsets can be introduced for neighboring cells on different frequencies.

Intergroup Measurements Handling UE Capability

According to one embodiment, the UE reports its capability which is directly or indirectly related to its inter-group measurement handling capability. The UE may report this capability to the radio node (e.g., eNode-B or RNC) or to any other network node (e.g., positioning node, LCS server, LCS target, E-SMLC, etc.). The UE capability information received by a node (e.g., eNode-B) may also be forwarded to other nodes (e.g., positioning node, core network node, SON node, O&M node, etc). Any of the nodes can act as the configuring node to adjust parameters associated with the switching point configuration and/or inter-group offset.

The UE may report, for example, the maximum supported inter-group distance (or offset) in time and/or in frequency. The UE may also signal one of N predefined levels corresponding to the inter-group measurement capability. The level may also contain predefined range of the offset levels. Example of N=4 levels without any specific range of offsets is given below:

0: UE supports small inter-group offset;
 1: UE supports medium inter-group offset;
 2: UE supports large inter-group offset;
 3: UE supports any inter-group offset.

The inter-group measurement handling capability may also be signaled for different types of measurements/RATs. The inter-group measurement handling capability may also depend upon the duplex mode (FDD, TDD, half duplex FDD) and also activity factor (DRX, DTX etc). For example there can be different capability with DRX (different cycles) and without DRX even for the same type or group of measurement. The inter-group measurement handling capability may be different for uplink and downlink measurements.

The inter-group measurement handling capability may be expressed in terms of number of 'measurement patterns' which can be used by the UE for performing the same or different types of measurements in parallel or at the same time or within certain time frame. For example the UE may indicate that it can perform RSRP and RSRQ measurements over their measurement period in L (e.g., L=6) cells by using R=3 different patterns provided the inter-gap distance between any two of the patterns is within P subframes (e.g., P=10 or P=20 subframes) or the inter-group distance between the subframes indicated for measurements by the patterns is within Q subframes (e.g., Q=4 subframes).

The inter-group measurement handling capability may also be expressed in terms of any one of K hardware capability levels of the UE e.g., low, medium, high etc. The hardware capability reflects the processing power or capability of the UE. Hence the UE capability indicator may also be expressed in terms of processing power e.g., low, medium, high, etc. For example if the UE hardware or processing capability indicator is 'High' then the UE can be assumed to be able to handle any large inter-group time offset, with or without overlap restriction. The inter-group time offset can also be predefined for different hardware or processing capabilities. For example 'High' may correspond to any inter-group offset and 'Low' may correspond to inter-group offset of 20 subframes and so on.

An indicator may be signaled indicating whether the inter-group offset is the same or not for a set of patterns associated with different group measurements. The indicator may be either the UE capability, e.g., some UEs may support only fully aligned/overlapping patterns for two or more measurement groups or the indicator may be the UE preference.

Adjusting Parameters Restricting Switching Point Configuration and Offsets

In this part, non-limiting methods for adjusting parameters that restrict switching point configuration and inter-group offset are described. The methods are performed by configuring nodes, most likely network nodes such as the RNC, eNodeB, positioning node, and so on.

The methods described earlier illustrate the relation between e.g., the optimal solution, MO periodicity and T*. See e.g., eq. (4). It is straightforward that the problem may not exist for large enough $T_i$ in relation to T* such as when the optimal solution is obtained with $k_1=k_2=0$. However, as indicated before, such a solution may not exist for all parameter combinations. Based on (4), given that T* is a fixed parameter for a given UE implementation, other parameters may be optimized, e.g., measurement periodicity at least for some groups.

In one embodiment, $T_1$ (the smallest measurement periodicity) may be increased up to $T_1^*$ to make (4) feasible, e.g., such that $T^* \leq T_1^*/2$. For example, if T*=150 ms and $T_1$=160 ms, there is no feasible solution for $k_1=k_2=0$, i.e., UMOs exist due to switching to another group measurements. For $T_1=T_2=160$ ms the optimal solution to the system of (1), (2), (3) is obtained for $k_1=k_2=1$, i.e., one UMO per switching, which results in at most 50% of UMOs in relation to the total MOs that might be utilized without the T* constraints. Note that the number of switching points depends on the number of MOs taken in sequence for each group prior to the next switching. Thus, the number of switching points may be another optimization parameter that can be decided e.g., by the UE.

Increasing $T_1$ twice allows us to obtain solutions for $k_1=k_2=0$, i.e., all configured MOs may be utilized. The amount of measurements will not change, but this may reduce UE complexity in terms of measurement flow algorithm by avoiding the need to account further for T*. Note also that increasing the measurement periodicity for some UEs may not necessarily imply increasing the transmission periodicity of the measured signals (e.g., PRS periodicity indicated in the OTDOA assistance data for a cell may be larger than the actual transmission periodicity of PRS signals in that cell). Different PRS periodicity may be indicated for the same cell for different UEs, e.g., depending on the UE capability of handling inter-group measurements. Generally, this can be viewed as determining a multiplying factor j to multiply the smallest measurement periodicity $T_1$ to make equation (4) feasible, i.e., $2T^* \leq jT_1(1+k_1+k_2\alpha_2)$, where j is a positive integer. Preferably, the multiplying factor j is a smallest positive integer such that $k_1=k_2=0$. When this occurs, the feasibility inequality reduces to $2T^* \leq jT_1$.

Illustration—Measurement Reporting Delay Requirements for OTDOA

The measurement reporting delay may depend on $T_1$, but may or may not depend on UE activity states. For example, inter-frequency RSTD maximum reporting delay requirements for FDD-FDD apply for non DRX as well as for all DRX cycles, but are functions of $T_{PRS}$:

$$T_{RSTD\ InterFreqFDD,E-UTRAN} = T_{PRS} \cdot (M-1) + \Delta\ ms \quad (6)$$

In equation (6), $T_{RSTD\ InterFreqFDD,E-UTRAN}$ is the total time for detecting and measuring at least n cells, $T_{PRS}$ is the cell-specific positioning subframe configuration period as defined in 3GPP TS 36.211, M is the number of PRS positioning occasions as defined in 3GPP TS 36.133, Table 8.1.2.6.1-1 (see Table 1 below), where a PRS positioning occasion is as defined in 3GPP TS 36.133, Section 8.1.2.5.1, and $$\Delta = 160 \cdot \left\lceil \frac{n}{M} \right\rceil$$

ms is the measurement time for a single PRS positioning occasion which includes the sampling time and the processing time.

TABLE 1

| Number of PRS measurement occasions within $T_{RSTD\ InterFreqFDD,E-UTRAN}$ | | |
|---|---|---|
| | Number of PRS positioning occasions M | |
| Positioning subframe configuration period $T_{PRS}$ | f2[Note 1] | f1 and f2[Note 2] |
| 160 ms | 16 | 32 |
| >160 ms | 8 | 16 |

[Note 1] When inter-frequency RSTD measurements are performed over the reference cell and neighbour cells, which belong to the FDD inter-frequency carrier frequency f2.
[Note 2] When inter-frequency RSTD measurements are performed over the reference cell and the neighbour cells, which belong to the serving FDD carrier frequency f1 and the FDD inter-frequency carrier frequency f2 respectively.

If $T_{PRS}$ defined above equals 160 ms, then the implication of doubling $T_1$ would be a change in $T_{RSTD\ InterFreqFDD,\ E-UTRAN}$. However, the increase in $T_{PRS}$ is compensated by lower M corresponding to larger $T_{PRS}$ (see Table 1). The overall change in $T_{RSTD\ InterFreqFDD,\ E-UTRAN}$ would then be only a slight decrease equal to $T_1$, according to the requirement equation (6). Modification of $T_1$ may be realized by a network node, e.g., signaling in the assistance data a larger $T_{PRS}$, or by the UE after receiving the assistance data, e.g., the UE receiving OTDOA assistance data for inter-frequency measurements and with $T_{PRS}$=160 ms ms indicated for at least some cells may assume $T_{PRS}$=320 ms. This means that with the methods described herein, there may be no need to change the requirements but may be addressed by implementation (e.g., the network may configure larger $T_{PRS}$ in the assistance data than PRS are actually transmitted in the concerned cell).

However, as the described methodology reveals, there is no problem for $T_{PRS}$>160 ms, so if the $T_{PRS}$>$T_1$=160 ms, then there should be no impact on the requirements—the requirements would remain the same when $T_{PRS}$>160 ms is the largest periodicity among n cells and thus is the value used in the requirement equation (6). In this situation, although there is no problem with the requirements, different UEs may still behave differently. In one embodiment, the UE receiving assistance data implying inter-group measurements and with $T_{PRS}$=160 ms indicated for at least one cell may assume $T_{PRS}$=320 ms when performing measurement for at least that cell.

Increasing the periodicity, as described above, is one approach to efficiently configure measurements and it may apply to:
- periodicity of one particular cell;
- periodicity of one group (e.g., all cells on f2 or reference cell on f1); and
- periodicity of all measured cells (e.g., all cells in the assistance data).

The configuring node (e.g., eNode-B, E-SMLC, etc) may use the UE capability information when adjusting the switching point configuration and inter-group offset in the network, in a cell, for group of UEs or for each UE individually. The network may also use the statistics of the capability of several UEs in order to adjust the parameters associated with the switching point configuration and inter-group offset. Some examples of such parameters include:
- measurement gap configuration,
- measurement periodicity,
- transmission signal periodicity,
- activity periods such as DRX or DTX,
- duplex configuration,
- measurement occasion offset,
- muting configuration such as PRS muting,
- measurement pattern configuration parameters such as blanking rate and indicators indicating specific time occasions for measurements;
- even the cell list in the assistance data sent to the UE may be related to the parameters associated with the switching point configuration and inter-group offset since the cell list impacts how the cells are grouped and whether switching points are necessary at all for the requested measurements; similarly, a UE may select a subset of cell to optimize the cell grouping such that switching points when performing measurements are optimized.

The methods described herein may be implemented statically, semi-statically or dynamically. In each case, they may be implemented in a configuring node (e.g., positioning node, SON, O&M, eNodeB, radio measurement units, etc.) and/or UE and may also be specified as predefined node or UE behavior (e.g., in case of adapting measurement periodicity, this may be read as "the UE may assume that the requirements for $T_{PRS}$=2$T_1$ will apply").

The network node may e.g., configure the parameters that impact the switching point, e.g., measurement periodicity of one or more measurement groups (measurement periodicity may be different from signal periodicity), use muting to indicate no measurements in some MOs, measurement groups (e.g., number of cells per frequency).

Figure 6:
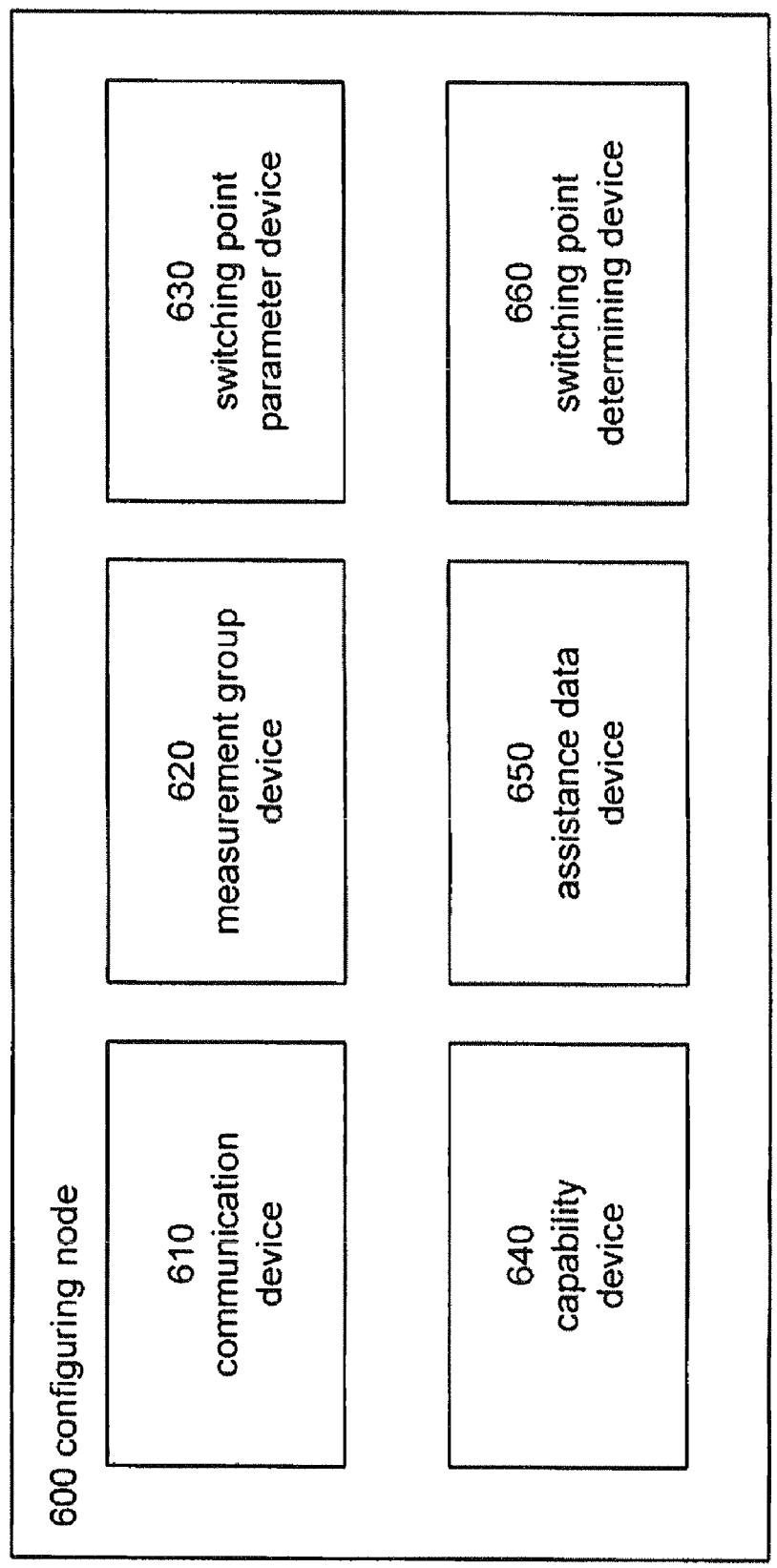
FIG. 6 illustrates an embodiment of configuring node.

An example configuring node is illustrated in FIG. 6. As seen, the configuring node 600, which may be a network node such as a radio node, may include a communication device 610, a measurement group device 620, a switching point parameter device 630, a capability device 640, an assistance data device 650 and a switching point determining device 660. The communication device 610 communicates with other network nodes, for example over LPP, LPPa, SUPL, and so on. The measurement group device 620 determines the measurement groups for one or more measuring nodes 700. The determined measurement groups may be used as predictions of measurement groups the measuring nodes 700 themselves will set. The switching point parameter device 630 can adjust parameters so that the number and periodicity of switching points can be optimized. The switching point parameter device 630 can also adjust the parameters that restrict switching point configuration and inter-group offsets. The capability device 640 can determine the capability information of the measuring nodes 700, and can also forward, via the communication device 610, the capability information to other network nodes including other configuring nodes 600. The assistance data device 650 can send, via the communication device 610, assistance data to the measuring nodes 700. The switching point determining device 660 can determine the switching points that the measuring node 700 will set.

FIG. 6 provides a logical view of the configuring node 600 and the devices included therein. It is not strictly necessary that each device is implemented as a physically separate module. Some or all devices may be combined in a physical module. Also, the devices need not be implemented strictly in hardware. It is envisioned that the devices can be implemented through a combination of hardware and software. For example, the configuring node 600 may include one or more central processing circuits executing program instructions stored in a non-transitory storage medium or in firmware to perform the functions of the devices.

Figure 7:
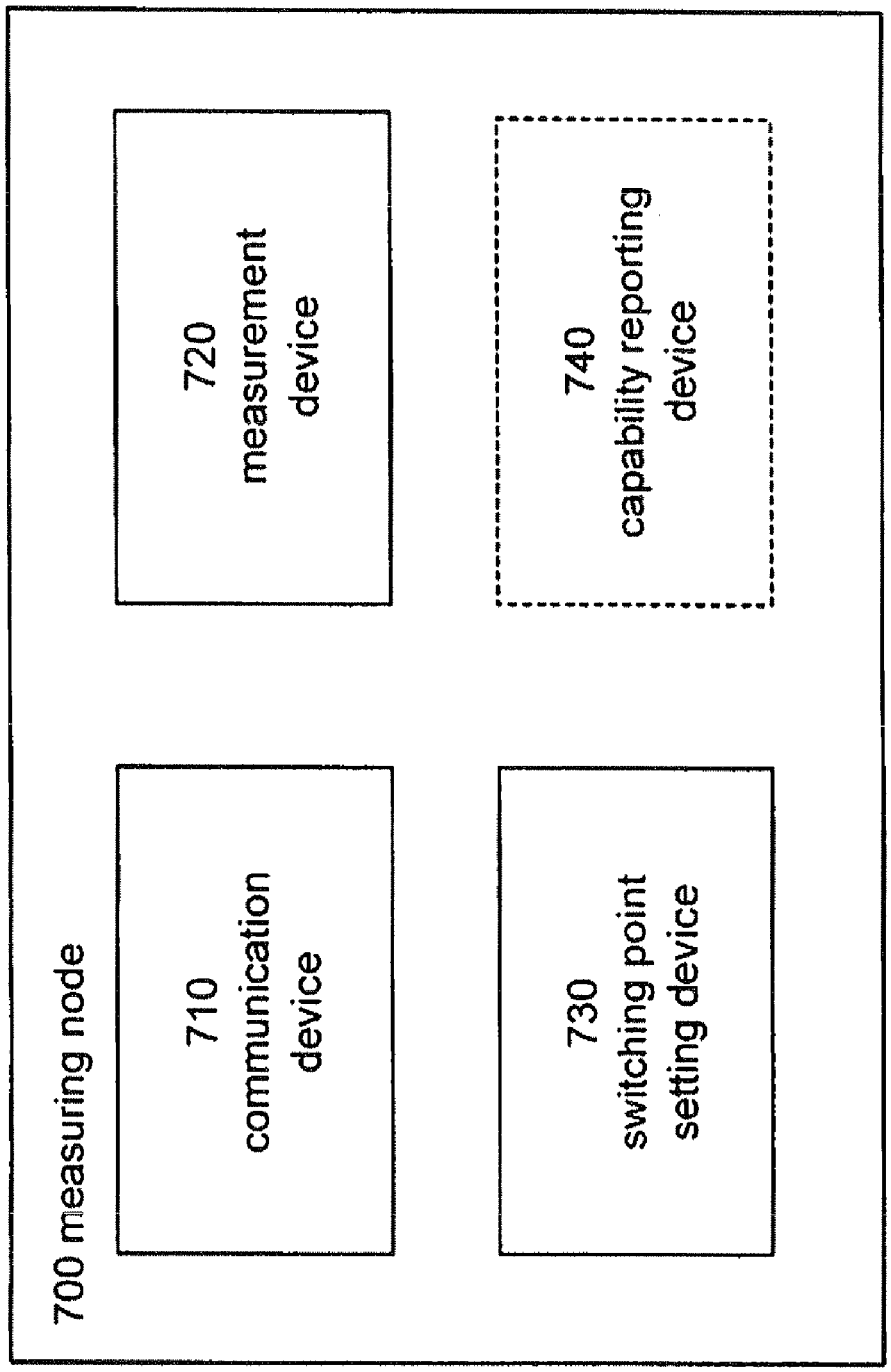
FIG. 7 illustrates an embodiment of measuring node.

An example mobile node, e.g., a UE, is illustrated in FIG. 7. As seen, the mobile node 700 may include a communication device 710, a measurement device 720, and a switching point setting device 730. The communication device 710 communicates with other network nodes. The measurement device 720 performs the measurements for positioning purposes. The switching point setting device 730 sets the switching points. Optionally, the mobile node 700 can also include a capability reporting device 740, which reports the mobile node's capability, via the communication device 710, to the network, e.g., to the configuring node 600.

FIG. 7 also provides a logical view of the mobile node 700 and the devices included therein. It is not strictly necessary that each device is implemented as a physically separate module. Some or all devices may be combined in a physical module. Also, the devices need not be implemented strictly in hardware. It is envisioned that the devices can be implemented through a combination of hardware and software. For example, the mobile node 700 may include one or more central processing devices executing program instructions stored in a non-transitory storage medium or in firmware to perform the functions of the devices.

The following should be noted regarding the switching point determining device 660 of the configuring node 600 and the switching point setting device 730 of the measuring node 700. There is a difference between setting (or deciding) the switching point and determining the switching point. Both—that is setting and determining—may be performed in the configuring node or in the measuring node. Setting, however, is more typical for the measuring node, e.g., the UE. Also, determining does not necessarily imply that setting is performed by the same node. Determining may be implemented in the measuring node, the configuring node, or both. When the switching point determining is performed by both the configuring and measuring nodes, the network node can determine (not necessarily set) the switching point and account for this when building up the assistance data. Also, the measuring node can set/configure measurements accordingly. The switching point determining is very likely to be impacted by the assistance data configured by the network.

Figure 8:
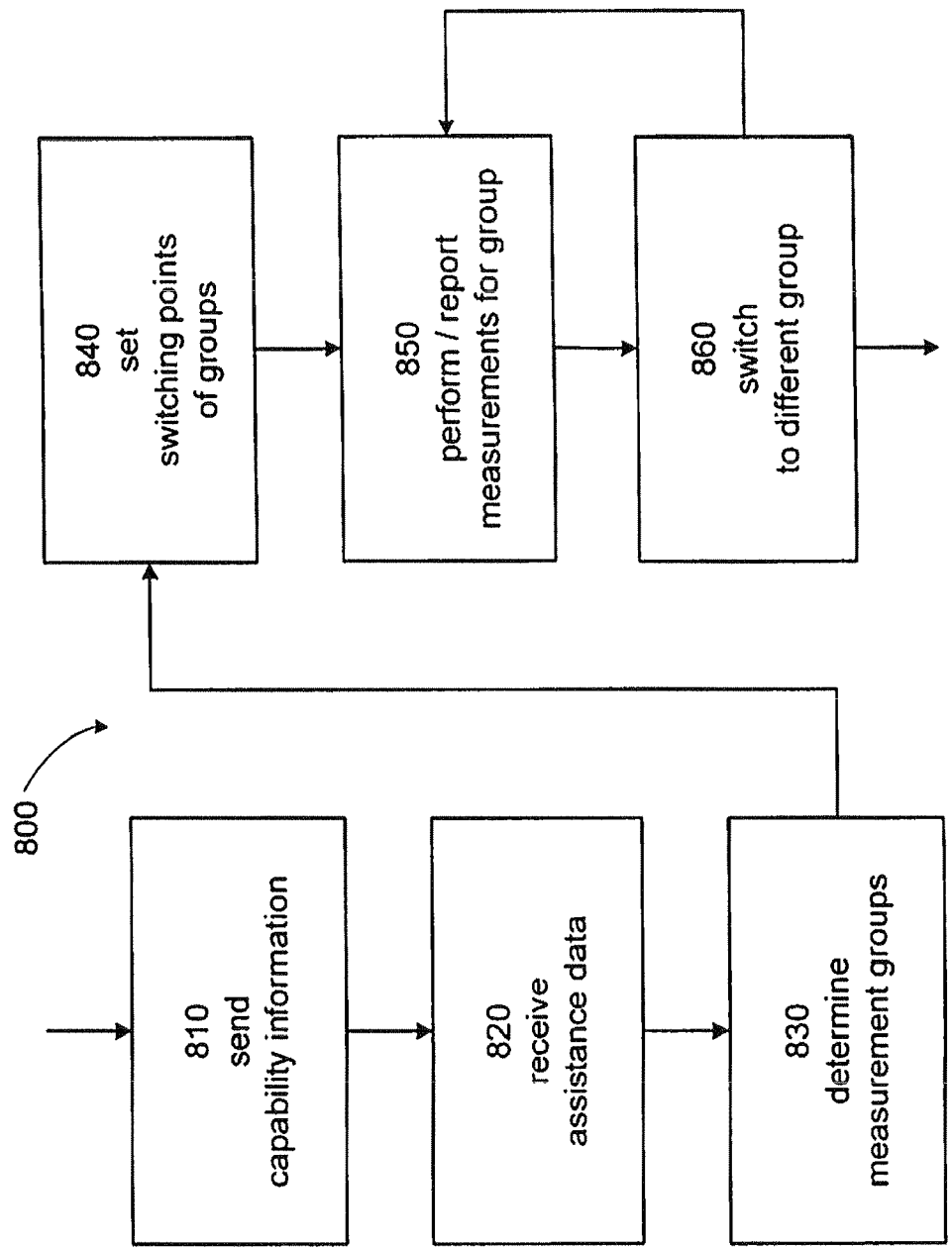
FIG. 8 illustrates an example method performed at a measuring node.

FIG. 8 illustrates an example method 800 performed at the measuring node 700 such as a UE. As seen, in step 810, the capability reporting device 740 may send, via the communication device 710, the inter-group measurement handling capability information of the measuring node 700 to the configuring node 600. As described above, the inter-group measurement handling capability information inter-group measurement handling capability can be expressed in one or several ways including supported measurement types, supported radio access technologies, supported frequency bands, supported measurement patterns, a maximum number of measurements performed in parallel, minimum time to perform measurement, a maximum supported inter-group offset in time and/or frequency, any one of N offset range levels where each offset set range level corresponding to a predetermined range of time offsets, and any one of K hardware capability levels where each hardware capability level corresponding to a predetermined level of processing capability. Also recall that the measuring node's capability may depend on any one or more of a measurement type, radio access technology, whether measurement is done on uplink signals or downlink signals or both, duplex mode (e.g., FDD, TDD, half duplex FDD), and activity state (e.g., DTX, DRX).

In step 820, the switching point setting device 730 may receive assistance data from the configuring node 600 via the communication device 710. Recall that the assistance data can include any one or more of cell identifications, cell frequencies, measured signal configurations (e.g., PRS configuration), measurement bandwidth (e.g., PRS measurement bandwidth), number of consecutive subframes configured for performing measurements (e.g., $N_{PRS}$), measurement periodicity (e.g., $T_{PRS}$), expected reference signal time difference (RSTD), and expected RSTD uncertainties.

In step 830, the switching point setting device 730 may set the plurality of measurement groups. As noted previously, the measurement groups may be set based on a list of cells identified by the received cell identifications and based on information associated with the cells. In one aspect, the switching point setting device 730 may group the measurement groups based on a grouping criteria, in which the criteria includes any one or more of measurement types, number of configured measurements, number of measured cells, measured frequencies, and radio access technologies. Each measurement group may further specify any one or more of a set of one or more frequencies of the group of signals to be measured, a set of one or more cells from which the group of signals transmitted therefrom are measured, and a set of one or more radio access technologies of the group of signals to be measured. Each measurement group can be differentiated from all other measurement groups in any one or more of the set of frequencies, the set of cells, and the set of radio access technologies.

In step 840, the switching point setting device 730 may set the switching points for the plurality of measurement groups. As described above, each measurement group may specify measurements to be made by the measuring node 700, in particular by the measurement device 720, of one or more signals transmitted by one or more cells. The signals of each measurement group may be transmitted by the one or more cells in measurement occasions corresponding to that measurement group, and the measurement occasions corresponding each measurement group may repeat in a measurement occasion pattern associated with that measurement group. As indicated above, in one aspect, the switching point setting device 730 may set the switching points between first and second measurement groups based on minimum necessary times and based on intergroup offsets. Preferably, the switching points are set such that a number of unused measurement occasions is minimized. The switching points may also be set in consideration of restrictions including any one or more of an overlap restriction, a measurement gap restriction, a minimum number of consecutive measurement occasions before switching from one measurement group to another, and a number of consecutive subframes per measurement occasion.

The measurement device 720 in step 850 may perform measurements of the signals corresponding to a measurement group such as a measurement group x, and in step 860 switch at each switching point $sp_{x \to y}$ from performing measurements according to the measurement group x to performing measurements according to a measurement group y. The switching point $sp_{x \to y}$ is a time by which the measurement device 720 is expected to complete, at least in part, the measurements of the measurement group x and to be ready to proceed with measurements of the measurement group y. Recall that "at least in part" indicates that the measuring node 700 may stop sampling, and may maintain in memory aspects of the performed measurements. Also, it should be noted that the measurements for the group y may not necessarily start immediately after the switching has been initiated since the switching itself may also take some time.

It should be noted that not all steps in FIG. 8 are required. For example, the measuring node 700 need not receive assistance data in step 820 to determine the measurement groups in step 830 and subsequently set the switching points and perform measurements in steps 840, 850 and 860. Step 810 is also optional, i.e., the measuring node 700 need not send its capability information.

Figure 9:
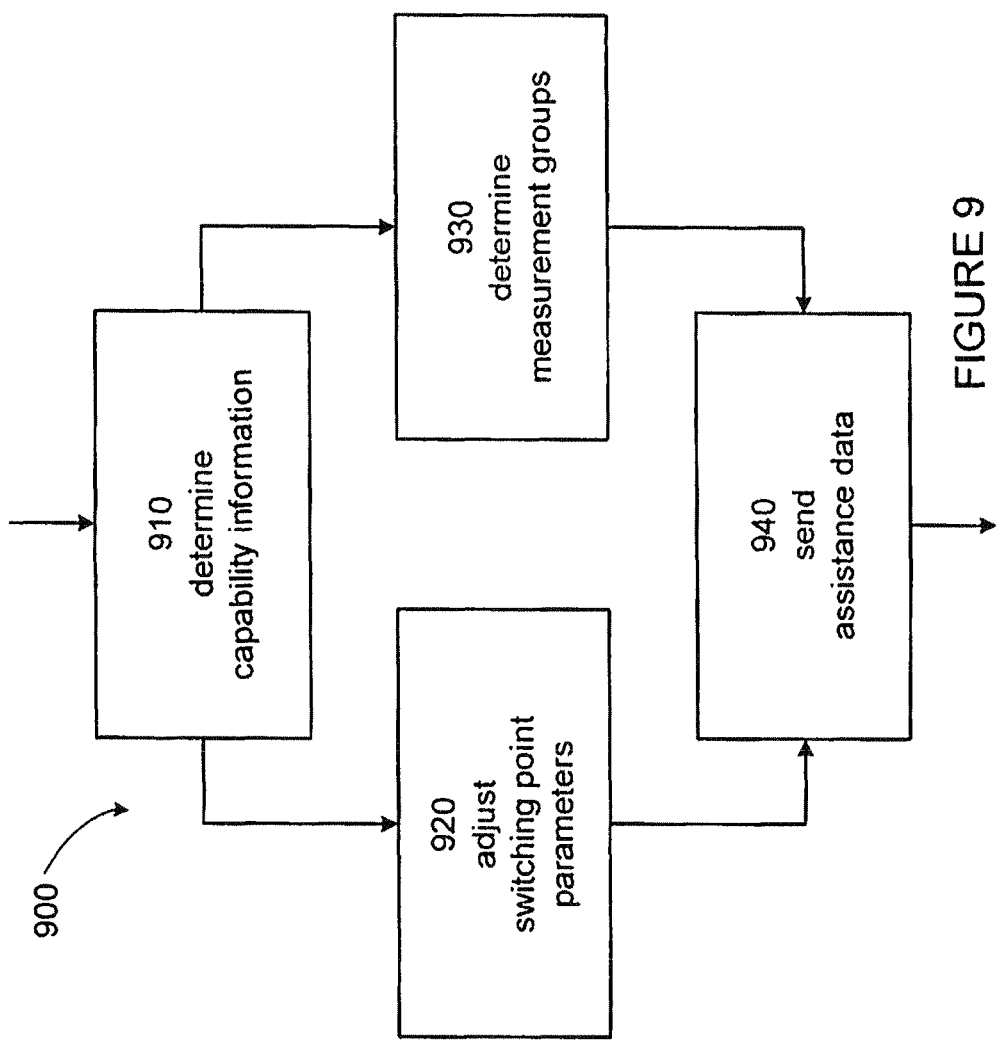
FIG. 9 illustrates an example method performed at a configuring node.

FIG. 9 illustrates an example method 900 performed at a configuring node such as a radio node. In step 910, the capability device 640 may determine the inter-group measurement handling capability of the measuring node 700 based on any one or more of an explicit signaling from the measuring node 700, information on the capability of the measuring node 700 forwarded from a network node such as another radio node, and statistics of capabilities of multiple measuring nodes 700.

In step 920, the switching point parameter device 630 may adjust parameters associated with measurements to be performed by the measuring node 700. The parameters may include any one or more of measurement gap configuration, measurement periodicity, transmission signal periodicity, DRX activity period, DTX activity period, duplex configuration, measurement occasion offset, measured signal configuration, measured signal muting configuration, measurement bandwidth, expected RSDT, expected RSTD uncertainties, blanking rate, indicators indicating specific time occasions for measurements, cell identifications and cell frequencies. The parameters may be adjusted based one or more restrictions such as the overlap restriction, the measurement gap restriction, and so on. In an aspect, the switching point parameter device 630 may adjust the parameters so as to allow the measuring node 700 to minimize the number of unused measuring occasions.

In step 940, the assistance data device 650 may send assistance data to the measuring node 700 specifying a list of one or more signals to be measured. In one aspect, the assistance data may also include the parameters adjusted in step 920.

In step 930, the measurement group device 620 may determine the plurality of measurement groups based on the list of one or more signals to be measured by the measuring node 700 and based on the inter-group measurement handling capability of the measuring node 700. The measurement groups enable the measuring node 700 to set the switching points for the measurement groups.

Note that not all steps in FIG. 9 are required. For example, the configuring node 600 may not receive the capability information in step 910 from the measuring node. Also, in both FIGS. 8 and 9, the switching point may be determined or set for DL, UL or DL/UL measurements (e.g., round-trip, timing advance or Rx-Tx time measurements involve both DL and UL). The switching point may be determined and/or set by a network node, including a radio node, or the measuring node such as a UE. As indicated previously, one should bear in mind that there is a difference between setting/deciding the switching point and determining the switching point.

A non-exhaustive list of advantages of one or more aspects of the present disclosure include:

Maintaining network flexibility in configuring measurements and ensuring the UE complexity at a desired level by controlling the switching point; and Methods for optimizing switching point and thus UE complexity are provided;

Network awareness of the UE capability related to handling group measurements.

Although the description above contains many specifics, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed at a measuring node to perform measurements of signals in a wireless network, the method comprising:

setting switching points for a plurality of measurement groups, each measurement group specifying measurements to be made by the measuring node of one or more signals transmitted by one or more cells;

performing measurements of the signals corresponding to a measurement group; and switching, at each switching point $sp_{x \to y}$, from performing measurements according to a measurement group x to performing measurements according to a measurement group y, wherein the one or more signals of each measurement group are transmitted by the one or more cells in measurement occasions (MO) corresponding to that measurement group in which the MOs corresponding each measurement group repeats in a MO pattern associated with that measurement group, wherein a switching point $sp_{x \to y}$ is a time by which the measuring node is expected to complete, at least in part, the measurements of the measurement group x and to be ready to proceed with measurements of the measurement group y, wherein in each measurement group further specifies any one or more of a set of one or more frequencies of the group of signals to be measured, a set of one or more cells from which the group of signals transmitted therefrom are measured, and a set of one or more radio access technologies (RAT) of the group of signals to be measured, and wherein each measurement group is differentiated from all other measurement groups in any one or more of the set of frequencies, the set of cells, and the set of RATs.

2. The method of claim 1, further comprising:

receiving assistance data from a configuring node, the assistance data comprising one or more of cell identifications, cell frequencies, measured signal configurations, measurement bandwidth, number of consecutive subframes configured for performing measurements, measurement periodicity, expected reference signal time difference (RSTD), and expected RSTD uncertainties; and determining the plurality of measurement groups based on a list of cells identified by the received cell identifications and based on information associated with the cells.

3. The method of claim 2, wherein the step of determining the plurality of measurement groups based on the list of cells identified by the received cell identifications and based on information associated with the cells comprises grouping the plurality of measurement groups based on a grouping criteria, and wherein the grouping criteria includes any one or more of measurement types, number of configured measurements, number of measured cells, measured frequencies, and radio access technologies (RAT).

4. The method according to claim 1, wherein the step of setting switching points comprises determining switching points between first and second measurement groups based on a minimum necessary times and based on intergroup offsets, wherein the minimum necessary times $T_1^*$, $T_2^*$ respectively represent minimum amounts of time necessary for the measuring node to complete, at least in part, the measurements of the first and second measurement groups, and wherein an intergroup offset $offset_{1 \to 2}$ represents a closest offset from a start of the MO of the first measurement group to a start of the MO of the second measurement group, and an intergroup offset $offset_{2 \to 1}$ represents a closest offset from the start of the MO of the second measurement group to the start of the MO of the first measurement group.

5. The method of claim 4, wherein the step of setting the switching points for the measurement groups comprises setting the switching points such that a number of unused measurement occasions (UMO) is minimized, a UMO being a MO not used by the measuring node to perform the measurements corresponding to a measurement group.

6. The method of claim 4, wherein the step of setting the switching points for the measurement groups comprises:
determining values $k_1$ and $k_2$ between first and second measurement groups such that an inequality $2T^* \leq T_1(1+k+k_2\alpha_2)$ is satisfied in which
$T^*$ represents a minimum time necessary complete group measurements, at least in part, of each group,
$k_1$ and $k_2$ represent numbers of unused measurement occasions $UMO_1$, $UMO_2$ of the first and second measurement groups, respectively, each of $k_1$ and $k_2$ being an integer zero or greater,
$T_1 = \text{offset}_{1 \to 2} + \text{offset}_{2 \to 1}$ represents a periodicity of the measurement occasions $MO_1$ of the first measurement group, $\text{offset}_{1 \to 2}$ and $\text{offset}_{2 \to 1}$ being the intergroup offsets of the first and second measurement groups, and
$\alpha_2 = T_2/T_1$ represents a ratio of periodicities of the measurement occasions $MO_2$ of the second measurement group relative to the measurement occasions $MO_1$ of the first measurement group, $\alpha_2 \geq 1$.

7. The method of claim 4, wherein the step of setting switching points comprises setting switching points between the first and second measurement groups also based one or more restrictions.

8. The method of claim 7, wherein the one or more restrictions include any one or more of:
an overlap restriction $\epsilon$ representing a number of subframes of the first and second measurement occasions that should not overlap with each other,
a measurement gap restriction specifying that measurement gaps used for the second group measurements are not to overlap with measurement occasions of the first measurement group,
a minimum number of consecutive MOs before switching from the first to the second measurement group and/or vice versa, and
a number of consecutive subframes per MO.

9. The method of claim 1, further comprising:
sending inter-group measurement handling capability information of the measuring node to a configuring node, wherein the capability information is related to its ability to handle inter-group measurement.

10. The method of claim 9, wherein the inter-group measurement handling capability is expressed in terms of any one or more of the following:
supported measurement types,
supported radio access technologies (RAT),
supported frequency bands,
supported measurement patterns,
a maximum number of measurements performed in parallel,
minimum time to perform measurement,
a maximum supported inter-group offset in time and/or frequency,
any one of N offset range levels, each offset set range level corresponding to a predetermined range of time offsets, and
any one of K hardware capability levels, each hardware capability level corresponding to a predetermined level of processing capability.

11. The method of claim 10, further comprising:
sending an indicator indicating whether the inter-group offset is the same or different for different measurement groups.

12. The method of claim 9, wherein the measurement handling capability information depends based on any one or more of a measurement type, radio access technology, whether measurement is done on uplink signals or downlink signals or both, duplex mode, and activity state.

13. The method of claim 1, wherein the measuring node is a user equipment (UE).

14. A method performed at a configuring node to configure measurements in a wireless network, the method comprising:
determining a plurality of measurement groups based on a list of one or more signals to be measured by a measuring node and based on an inter-group measurement handling capability of the measuring node, each measurement group specifying measurements to be made on one or more signals transmitted by one or more cells,
wherein the plurality of measurement groups enable the measuring node to set switching points for the measurement groups,
wherein the one or more signals of each measurement group are transmitted by the one or more cells in measurement occasions (MO) corresponding to that measurement group,
wherein the MOs corresponding each measurement group repeats in a MO pattern associated with that measurement group,
wherein a switching point $sp_{x \to y}$ is a time by which the measuring node is expected to complete, at least in part, the measurements of the measurement group x and to be ready to proceed with measurements of the measurement group y,
wherein each measurement group further specifies any one or more of
a set of one or more frequencies of the group of signals to be measured,
a set of one or more cells from which the group of signals transmitted therefrom are measured, and
a set of one or more radio access technologies of the group of signals to be measured, and
wherein each measurement group is differentiated from each of all other measurement groups in any one or more of the set of frequencies, the set of cells, and the set of radio access technologies.

15. The method of claim 14, further comprising determining the inter-group measurement handling capability of the measuring node based on any one or more of:
an explicit signaling from the measuring node,
information on the capability of the measuring node forwarded from a network node, and
statistics of capabilities of multiple measuring nodes.

16. The method of claim 15, wherein the inter-group measurement handling capability of the measuring node is expressed in any one or more of the following:
supported measurement types,
supported radio access technologies (RAT),
supported frequency bands,
supported measurement patterns,
a maximum number of measurements performed in parallel,
minimum time to perform measurement,
a maximum supported inter-group offset in time and/or frequency,
any one of N offset range levels, each offset set range level corresponding to a predetermined range of time offsets,
any one of K hardware capability levels, each hardware capability level corresponding to a predetermined level of processing capability, and
dependency of the measuring node's measurement handling capability upon any one or more of a measurement type, radio access technology, whether measurement is done on uplink signals or downlink signals or both, duplex mode, and activity state.

17. The method of claim 14,
wherein the switching points between first and second measurement groups are set by the measuring node based on minimum necessary times and based on inter-group offsets,
wherein the minimum necessary times $T_1^*$, $T_2^*$ respectively represent minimum amounts of time necessary for the measuring node to complete, at least in part, the measurements of the first and second measurement groups,
wherein an inter-group offset $offset_{1 \to 2}$ represents a closest offset from a start of the MO of the first measurement group to a start of the MO of the second measurement group, and an intergroup offset $offset_{2 \to 1}$ represents a closest offset from the start of the MO of the second measurement group to the start of the MO of the first measurement group, and
wherein the step of determining the plurality of measurement groups comprises arranging the measurement groups based on the inter-group measurement handling capability of the measuring node so as to set the minimum necessary time $T_1^*$, $T_2^*$ and the intergroup offsets $offset_{1 \to 2}$, $offset_{2 \to 1}$ to enable the measuring node to minimize a number of a number of unused measuring occasions (UMO) when setting the switching points, a UMO being a MO not used by the measuring node to perform the measurements corresponding to a measurement group.

18. The method of claim 14, further comprising:
sending assistance data to the measuring node specifying the list of one or more signals to be measured,
wherein the assistance data comprises one or more of cell identifications, cell frequencies, measured signal configurations, measurement bandwidth, number of consecutive subframes configured for performing measurements, measurement periodicity, expected reference signal time difference (RSTD), and expected RSTD uncertainties.

19. The method of claim 18, further comprising:
adjusting parameters associated with measurements to be performed by the measuring node,
wherein the step of sending the assistance data to the measuring node comprises including the adjusted parameters in the assistance data sent to the measuring node.

20. The method of claim 19, wherein the parameters include any one or more of measurement gap configuration, measurement periodicity, transmission signal periodicity, DRX activity period, DTX activity period, duplex configuration, measurement occasion offset, measured signal configuration, measured signal muting configuration, measurement bandwidth, expected RSDT, expected RSTD uncertainties, blanking rate, indicators indicating specific time occasions for measurements, cell identifications and cell frequencies.

21. The method of claim 19, wherein the step of adjusting the parameters comprises adjusting the parameters based one or more restrictions.

22. The method of claim 21, wherein the one or more restrictions include:
an overlap restriction ε representing a number of subframes of the first and second measurement occasions that should not overlap with each other,
a measurement gap restriction specifying that measurement gaps used for the second group measurements are not to overlap with measurement occasions of the first measurement group,
a minimum number of consecutive MOs before switching from the first to the second measurement group and/or vice versa, and
a number of consecutive subframes per MO.

23. The method of claim 14, wherein an indicator indicating whether the inter-group offset is the same or different for different measurement groups is included in the assistance data.

24. The method of claim 14, wherein the measuring node is a user equipment (UE).

25. A measuring node structured to perform measurements of signals in a wireless network, the measuring node comprising:
a communication device structured to communicate with other network nodes;
a switch point setting device structured to set switching points for a plurality of measurement groups, each measurement group specifying measurements to be made by the measuring node of one or more signals transmitted by one or more cells; and
a measurement device structured to perform measurements of the signals corresponding to a measurement group, and structured to switch at each switching point $sp_{x \to y}$ from performing measurements according to a measurement group x to performing measurements according to a measurement group y,
wherein the one or more signals of each measurement group are transmitted by the one or more cells in measurement occasions (MO) corresponding to that measurement group in which the MOs corresponding each measurement group repeats in a MO pattern associated with that measurement group,
wherein a switching point $sp_{x \to y}$ is a time by which the measuring node is expected to complete, at least in part, the measurements of the measurement group x and to be ready to proceed with measurements of the measurement group y,
wherein in each measurement group further specifies any one or more of
a set of one or more frequencies of the group of signals to be measured,
a set of one or more cells from which the group of signals transmitted therefrom are measured, and
a set of one or more radio access technologies (RAT) of the group of signals to be measured, and
wherein each measurement group is differentiated from all other measurement groups in any one or more of the set of frequencies, the set of cells, and the set of RATs.

26. The measuring node of claim 25, wherein switching point setting device is structured to
receive assistance data from a configuring node via the communication device, the assistance data comprising one or more of cell identifications, cell frequencies, measured signal configurations, measurement bandwidth, number of consecutive subframes configured for performing measurements, measurement periodicity, expected reference signal time difference (RSTD), and expected RSTD uncertainties, and
determine the plurality of measurement groups based on a list of cells identified by the received cell identifications and based on information associated with the cells.

27. The measuring node of claim 26,
wherein the switching point setting device is structured to set the plurality of measurement groups based on the list of cells identified by the received cell identifications and based on information associated with the cells comprises grouping the plurality of measurement groups based on a grouping criteria, and wherein the grouping criteria includes any one or more of measurement types, number of configured measurements, number of measured cells, measured frequencies, and radio access technologies (RAT).

28. The measuring node according to claim 25, wherein the switching point setting device is structured to set the switching points between first and second measurement groups based on a minimum necessary times and based on intergroup offsets, wherein the minimum necessary times $T_1^*$, $T_2^*$ respectively represent minimum amounts of time necessary for the measuring node to complete, at least in part, the measurements of the first and second measurement groups, and wherein an intergroup offset $offset_{1 \to 2}$ represents a closest offset from a start of the MO of the first measurement group to a start of the MO of the second measurement group, and an intergroup offset $offset_{2 \to 1}$ represents a closest offset from the start of the MO of the second measurement group to the start of the MO of the first measurement group.

29. The measuring node of claim 28, wherein the switching point setting device is structured to set the switching points such that a number of unused measurement occasions (UMO) is minimized, a UMO being a MO not used by the measuring node to perform the measurements corresponding to a measurement group.

30. The measuring node of claim 28, wherein the switching point setting device is structured to set the switching points between the first and second measurement groups also based one or more restrictions.

31. The measuring node of claim 30, wherein the one or more restrictions include:

an overlap restriction ϵ representing a number of subframes of the first and second measurement occasions that should not overlap with each other, a measurement gap restriction specifying that measurement gaps used for the second group measurements are not to overlap with measurement occasions of the first measurement group, a minimum number of consecutive MOs before switching from the first to the second measurement group and/or vice versa, and a number of consecutive subframes per MO.

32. The measuring node of claim 25, further comprising:

a capability reporting device structured to send, via the communication device, inter-group measurement handling capability information of the measuring node to a configuring node.

33. The measuring node of claim 32, wherein the inter-group measurement handling capability is expressed in any one or more of the following:

supported measurement types,
supported radio access technologies (RAT),
supported frequency bands,
supported measurement patterns,
a maximum number of measurements performed in parallel,
minimum time to perform measurement,
a maximum supported inter-group offset in time and/or frequency,
any one of N offset range levels, each offset set range level corresponding to a predetermined range of time offsets,
any one of K hardware capability levels, each hardware capability level corresponding to a predetermined level of processing capability, and
dependency of the measuring node's measurement handling capability upon any one or more of a measurement type, radio access technology, whether measurement is done on uplink signals or downlink signals or both, duplex mode, and activity state.

34. The measuring node of claim 25, wherein the measuring node is a user equipment (UE).

35. A configuring node structured to configure measurements in a wireless network, the configuring node comprising:

a measurement group device structured to determine a plurality of measurement groups based on a list of one or more signals to be measured by a measuring node and based on an inter-group measurement handling capability of the measuring node, each measurement group specifying measurements to be made on one or more signals transmitted by one or more cells, wherein the plurality of measurement groups enable the measuring node to set switching points for the measurement groups, wherein the one or more signals of each measurement group are transmitted by the one or more cells in measurement occasions (MO) corresponding to that measurement group, wherein the MOs corresponding each measurement group repeats in a MO pattern associated with that measurement group, wherein a switching point $sp_{x \to y}$ is a time by which the measuring node is expected to complete, at least in part, the measurements of the measurement group x and to be ready to proceed with measurements of the measurement group y, wherein in each measurement group further specifies any one or more of
a set of one or more frequencies of the group of signals to be measured,
a set of one or more cells from which the group of signals transmitted therefrom are measured, and
a set of one or more radio access technologies of the group of signals to be measured, and wherein each measurement group is differentiated from each of all other measurement groups in any one or more of the set of frequencies, the set of cells, and the set of radio access technologies.

36. The configuring node of claim 35, further comprising a capability device is structured to determine the inter-group measurement handling capability of the measuring node based on any one or more of:

an explicit signaling from the measuring node,
information on the capability of the measuring node forwarded from a network node, and
statistics of capabilities of multiple measuring nodes.

37. The configuring node of claim 36, wherein the inter-group measurement handling capability of the measuring node is expressed in any one or more of the following:

supported measurement types,
supported radio access technologies (RAT),
supported frequency bands,
supported measurement patterns,
a maximum number of measurements performed in parallel,
minimum time to perform measurement,
a maximum supported inter-group offset in time and/or frequency, any one of N offset range levels, each offset set range level corresponding to a predetermined range of time offsets, any one of K hardware capability levels, each hardware capability level corresponding to a predetermined level of processing capability, and dependency of the measuring node's measurement handling capability upon any one or more of a measurement type, radio access technology, whether measurement is done on uplink signals or downlink signals or both, duplex mode, and activity state.

38. The configuring node of claim 35, wherein the switching points between first and second measurement groups are set by the measuring node based on minimum necessary times and based on inter-group offsets, wherein the minimum necessary times $T_1^*$, $T_2^*$ respectively represent minimum amounts of time necessary for the measuring node to complete, at least in part, the measurements of the first and second measurement groups, wherein an intergroup offset $offset_{1 \to 2}$ represents a closest offset from a start of the MO of the first measurement group to a start of the MO of the second measurement group, and an intergroup $offset_{2 \to 1}$ represents a closest offset from the start of the MO of the second measurement group to the start of the MO of the first measurement group, and wherein the measurement device is structured to determine the plurality of measurement groups based on the acquired inter-group measurement handling capabilities of the measuring node so as to set the minimum necessary time $T_1^*$, $T_2^*$ and the intergroup offsets $offset_{1 \to 2}$, $offset_{2 \to 1}$ to enable the measuring node to minimize a number of a number of unused measuring occasions (UMO) when setting the switching points, a UMO being a MO not used by the measuring node to perform the measurements corresponding to a measurement group.

39. The configuring node of claim 35, further comprising:

an assistance data device structured to send assistance data, via the communication device, to the measuring node specifying the list of one or more signals to be measured, wherein the assistance data further comprises one or more of cell identifications, cell frequencies, measured signal configurations, measurement bandwidth, number of consecutive subframes configured for performing measurements, measurement periodicity, expected reference signal time difference (RSTD), and expected RSTD uncertainties.

40. The configuring node of claim 39, wherein the switching point parameter device is structured to adjust parameters associated with measurements to be performed by the measuring node, and wherein the assistance data device is structured to include the adjusted parameters in the assistance data sent to the measuring node.

41. The configuring node of claim 40, wherein the parameters include any one or more of measurement gap configuration, measurement periodicity, transmission signal periodicity, DRX activity period, DTX activity period, duplex configuration, measurement occasion offset, measured signal configuration, measured signal muting configuration, measurement bandwidth, expected RSDT, expected RSTD uncertainties, blanking rate, indicators indicating specific time occasions for measurements, cell identifications and cell frequencies.

42. The configuring node of claim 40, wherein the switching point parameter device is structured to adjust the parameters based one or more restrictions.

43. The configuring node claim 42, wherein the one or more restrictions include:

an overlap restriction ∊ representing a number of subframes of the first and second measurement occasions that should not overlap with each other, a measurement gap restriction specifying that measurement gaps used for the second group measurements are not to overlap with measurement occasions of the first measurement group, a minimum number of consecutive MOs before switching from the first to the second measurement group and/or vice versa, and a number of consecutive subframes per MO.

44. The configuring node of claim 35, wherein the measuring node is a user equipment (UE).

* * * * *

UNITED STATES PATENT AND TRADEMARK OFFICE
CERTIFICATE OF CORRECTION

PATENT NO. : 8,406,790 B2
APPLICATION NO. : 13/380963
DATED : March 26, 2013
INVENTOR(S) : Kazmi et al.

It is certified that error appears in the above-identified patent and that said Letters Patent is hereby corrected as shown below:

On the Title Page, in item (57), in Column 2, Lines 9-10,
delete "node (700) node" and insert -- node (700) --, therefor.

In the Specification:

In Column 1, Line 57, delete "LOS" and insert -- LCS --, therefor.

In Column 11, Line 3, delete "muti-RAT" and insert -- multi-RAT --, therefor.

In Column 13, Line 13, delete "offset$_{1\rightarrow 2}$" and insert -- offset$_{1\rightarrow 2}$ --, therefor.

In Column 14, Line 23, delete "T=160" and insert -- T*=160 --, therefor.

In Column 20, Line 66, delete "RSDT," and insert -- RSTD, --, therefor.

In Column 21, Line 2, delete "based one" and insert -- based on one --, therefor.

In the Claims:

In Column 23, Line 7, in Claim 6, delete "$(1+k+k_2\alpha_2)$" and
insert -- $(1+k_1+k_2\alpha_2)$ --, therefor.

In Column 23, Line 24, in Claim 7, delete "based one" and insert -- based on one --, therefor.

In Column 25, Line 53, in Claim 20, delete "RSDT," and insert -- RSTD, --, therefor.

In Column 25, Line 57, in Claim 21, delete "based one" and insert -- based on one --, therefor.

Signed and Sealed this
Twenty-fourth Day of September, 2013

Teresa Stanek Rea
*Deputy Director of the United States Patent and Trademark Office*

CERTIFICATE OF CORRECTION (continued)
U.S. Pat. No. 8,406,790 B2

In Column 26, Line 51, in Claim 26, delete "structured to" and insert -- structured to: --, therefor.

In Column 27, Lines 34-35, in Claim 30, delete "based one" and insert -- based on one --, therefor.

In Column 29, Line 25, in Claim 38, delete "intergroup offset$_{2\rightarrow1}$" and insert -- intergroup offset offset$_{2\rightarrow1}$ --, therefor.

In Column 30, Line 20, in Claim 41, delete "RSDT," and insert -- RSTD, --, therefor.

In Column 30, Line 26, in Claim 42, delete "based one" and insert -- based on one --, therefor.

In Column 30, Line 27, in Claim 43, delete "node" and insert -- node of --, therefor.